US010227005B2

(12) United States Patent
Tane et al.

(10) Patent No.: US 10,227,005 B2
(45) Date of Patent: Mar. 12, 2019

(54) VEHICULAR DISPLAY DEVICE

(71) Applicant: DENSO CORPORATION, Kariya, Aichi-pref. (JP)

(72) Inventors: Seigo Tane, Kariya (JP); Katsumi Fujita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 215 days.

(21) Appl. No.: 15/021,755

(22) PCT Filed: Sep. 15, 2014

(86) PCT No.: PCT/JP2014/004743
§ 371 (c)(1),
(2) Date: Mar. 14, 2016

(87) PCT Pub. No.: WO2015/040851
PCT Pub. Date: Mar. 26, 2015

(65) Prior Publication Data
US 2016/0221440 A1    Aug. 4, 2016

(30) Foreign Application Priority Data

Sep. 17, 2013  (JP) .................................. 2013-192178
Aug. 21, 2014  (JP) .................................. 2014-168798

(51) Int. Cl.
*G01D 11/28*    (2006.01)
*B60K 35/00*    (2006.01)
(Continued)

(52) U.S. Cl.
CPC .............. *B60K 35/00* (2013.01); *B60K 37/02* (2013.01); *B60Q 3/18* (2017.02); *B60Q 3/68* (2017.02);
(Continued)

(58) Field of Classification Search
CPC . B60K 35/00; B60Q 3/18; B60Q 3/68; B60Q 3/12; B60Q 3/14; G01D 11/24;
(Continued)

(56) References Cited

U.S. PATENT DOCUMENTS 3,162,375 A * 12/1964 Huston .................... B60Q 3/64
362/619
5,741,058 A   4/1998 Suzuki et al.
(Continued)

FOREIGN PATENT DOCUMENTS

JP      S58060282 A    4/1983
JP      S62009121 U    1/1987
(Continued)

OTHER PUBLICATIONS

International Search Report and Written Opinion (in Japanese with English Translation) for PCT/JP2014/004743, dated Oct. 21, 2014; ISA/JP.

*Primary Examiner* — Anh T Mai
*Assistant Examiner* — Fatima N Farokhrooz
(74) *Attorney, Agent, or Firm* — Harness, Dickey & Pierce, P.L.C.

(57) ABSTRACT

A vehicular display device includes a plurality of monitors that include screens displaying vehicle information, a display board including a plurality transmission display portions each of which transmits and displays the screen of the respective monitors from a rear side and which are arranged side by side, a boundary portion that is positioned between the transmission display portions and an index display portion that forms an index row to display a vehicle state value, and an index light source that illuminates the index display portion. The index light source applies ultraviolet light for illuminating the index display portion to the index row from a front side of the display board, and the index row is formed in the display board in front of the transmission (Continued)

display portions over each of the transmission display portions interposing the boundary portion, and the index row is irradiated when receiving the ultraviolet light. Accordingly, the appearance of the display performed by the vehicular display device is improved.

13 Claims, 19 Drawing Sheets

(51) Int. Cl.
  *G01D 11/24* (2006.01)
  *B60Q 3/68* (2017.01)
  *B60Q 3/18* (2017.01)
  *B60K 37/02* (2006.01)

(52) U.S. Cl.
  CPC .......... *G01D 11/24* (2013.01); *G01D 11/28* (2013.01); *B60K 2350/1064* (2013.01); *B60K 2350/2039* (2013.01)

(58) Field of Classification Search
  CPC ........ G01D 11/28; G01D 11/00; G01D 13/02; G01D 13/04; G01D 13/22; G01D 13/20
  See application file for complete search history.

(56) References Cited

U.S. PATENT DOCUMENTS

| | | | |
|---|---|---|---|
| 2002/0140552 A1 | 10/2002 | Wada | |
| 2002/0189526 A1* | 12/2002 | Sugimoto | B60K 37/02 116/286 |
| 2003/0042847 A1 | 3/2003 | Usui et al. | |
| 2007/0040662 A1 | 2/2007 | Harada et al. | |
| 2007/0064322 A1* | 3/2007 | Migitaka | B41J 3/407 359/885 |
| 2009/0068418 A1* | 3/2009 | Iwase | B60K 37/02 428/195.1 |
| 2010/0220493 A1* | 9/2010 | Bowden | G01D 11/28 362/560 |
| 2012/0000413 A1* | 1/2012 | Ikarashi | B60K 37/02 116/286 |
| 2012/0106124 A1* | 5/2012 | Okamoto | B60K 37/02 362/23.21 |
| 2012/0218493 A1* | 8/2012 | Funada | B60K 35/00 349/58 |
| 2012/0233895 A1* | 9/2012 | Martin | C09K 11/02 40/542 |
| 2013/0174773 A1* | 7/2013 | Nagara | B60K 37/02 116/201 |
| 2013/0199064 A1* | 8/2013 | O'Kell | G09F 13/18 40/542 |

FOREIGN PATENT DOCUMENTS

| | | |
|---|---|---|
| JP | S64020415 A | 1/1989 |
| JP | H02021595 U | 2/1990 |
| JP | H05013833 U | 2/1993 |
| JP | H0600796 Y2 | 1/1994 |
| JP | H08128865 A | 5/1996 |
| JP | H09101752 A | 4/1997 |
| JP | 2002156251 A | 5/2002 |
| JP | 2002293163 A | 10/2002 |
| JP | 2003004493 A | 1/2003 |
| JP | 2003076305 A | 3/2003 |
| JP | 02005037237 A * | 2/2005 |
| JP | 2005037237 A | 2/2005 |
| JP | 2006194613 A | 7/2006 |
| JP | 2007050764 A | 3/2007 |
| JP | 2012194138 A | 10/2012 |

* cited by examiner

LIGHT

VEHICULAR DISPLAY DEVICE

CROSS-REFERENCE TO RELATED APPLICATIONS

This application is a U.S. National Phase Application under 35 U.S.C. 371 of International Application No. PCT/JP2014/004743 filed on Sep. 15, 2014 and published in Japanese as WO 2015/040851 A1 on Mar. 26, 2015. This application is based on and claims the benefit of priority from Japanese patent applications No. 2013-192178 filed on Sep. 17, 2013 and No. 2014-168798 filed on Aug. 21, 2014. The entire disclosures of all of the above applications are incorporated herein by reference.

TECHNICAL FIELD

The present disclosure relates to a vehicular display device that displays vehicle information.

BACKGROUND ART

A technique in which an index display portion is provided on a display board in a vehicular display device in addition to transmission display portions has been known in the past. The transmission display portions transmit and display monitor screens, which display vehicle information, from the rear side and the index display portion forms an index row with numerals, scales, and the like to display a vehicle state value.

In a device disclosed in PTL 1 as a vehicular display device that employs the technique, plural monitor screens are individually displayed and transmitted by plural transmission display portions arranged side by side on a display board. In addition, in the device disclosed in PTL 1, an index display portion is illuminated by an index light source emitting light so that the index row is displayed.

PRIOR ART LITERATURE

Patent Literature

PTL 1: JP 2003-4493 A

SUMMARY OF THE INVENTION

Boundary portions between the respective transmission display portions, which are offset toward the inner periphery from the index row displayed and which perform transmission display, on the display board of the device disclosed in PTL 1 are viewed by an occupant as non-display portions that do not perform both transmission display and light-emitting display. As a result, the occupant is likely to pay attention to the boundary portions, i.e., discontinuous portions of the display of the vehicle information, between the respective transmission display portions. As a result, since a sense of incongruity is given to the occupant, there is a concern that the appearance may deteriorate.

This disclosure has been made in view of the above-mentioned point, and an object of the disclosure is to improve the appearance of the display performed by a vehicular display device.

In a first disclosure, a vehicular display device including: a plurality of monitors, each of the plurality of monitors including a screen displaying vehicle information; a display board including a plurality of transmission display portions arranged side by side, a boundary portion positioned between the plurality of transmission display portions, and an index display portion forming an index row to display a vehicle state value, each of the plurality of transmission display portions transmitting and displaying the screen of a respective one of the plurality of monitors from a rear side; and an index light source that illuminates the index display portion, wherein the index light source applies ultraviolet light for irradiating the index display portion to the index row from a front side of the display board, the index row is formed on the display board in front of and over each of the plurality of transmission display portions over each of the plurality of transmission display portions that interpose the boundary portion, and the index row is irradiated when irradiated receiving the ultraviolet light.

According to the first disclosure, the index row formed on the display board by the index display portion is irradiated in front of the respective transmission display portions that transmit and display the respective screen of the plural monitors from the rear side and are arranged side by side, when the index row receives ultraviolet light emitted from the index light source. According to this structure, the occupant is less likely to pay attention to the boundary portions between the respective transmission display portions that perform transmission display at the rear side of the index row displayed than the index row that is displayed. As a result, a sense of incongruity, which is caused when the boundary portions between the respective transmission display portions, i.e., discontinuous portions of the display of the vehicle information, are viewed by the occupant, can be reduced as much as possible. As a result, the appearance of display performed by the vehicular display device can be improved.

In a second disclosure, the display board is curved to have a curvature in a horizontal direction, and the plurality of monitors are arranged side by side in the horizontal direction along the display board.

According to the second disclosure, since the plural monitors arranged side by side in the horizontal direction are disposed along the display board even though the display board is curved to have a curvature, a wide display range for the vehicle information displayed by the respective transmission display portions can be ensured. According to this structure, when plural general-purpose monitors having flat screens are used even if a monitor having a screen curved along the display board is not used, the display of the vehicle information over a wide range can be realized. Moreover, the occupant's attention to the boundary portions between the respective transmission display portions can be suppressed. Accordingly, the appearance of the display performed by the vehicular display device, which is suitable for mass production, can be improved.

In a third disclosure, a vehicular display device comprising: a plurality of monitors, each of the plurality of monitors including a screen displaying vehicle information; a first display board including a plurality of transmission display portions arranged side by side and a boundary portion positioned between the plurality of transmission display portions, each of the plurality of transmission display portions transmitting and displaying the screen of a respective one of the plurality of monitors from a rear side; a second display board that includes an index display portion forming an index row in front of the first display board to display a vehicle state value; and an index light source that illuminates the index display portion, wherein the index light source applies visible light for illuminating the index display portion to the index row from an edge portion of the second display board, the second display board includes a plurality of concave surface portions that are recessed in a pyramid shape forward from a rear surface of the second display board to reflect forward the visible light emitted from the index light source, the index row is formed in front of and over each of the plurality of transmission display portions that interpose the boundary portion, and the plurality of concave surface portions are arranged to form a respective one of a plurality of indexes, which form the index row, so that the plurality of indexes are illuminated by receiving the visible light emitted from the index light source.

According to the third disclosure, the index row formed on the second display board by the index display portion is illuminated in front of the respective transmission display portions that transmit and display the respective screens of the plural monitor on the first display board from the rear side and that are arranged side by side when the index row receives the visible light emitted from the index light source. Here, each of the indexes, which form the index row, is illuminated by arranging the plural concave surface portions that are recessed forward from the rear surface of the second display board in the shape of a pyramid and that reflect the visible light forward. According to this structure, the occupant is less likely to pay attention to the boundary portions between the respective transmission display portions that perform transmission display in the rear of the index row illuminated than the index row that is illuminated. As a result, a sense of incongruity, which is caused when the boundary portions between the respective transmission display portions, i.e., discontinuous portions of the display of the vehicle information, are viewed by the occupant, can be reduced as much as possible. As a result, the appearance of display performed by the vehicular display device can be improved.

In a forth disclosure, the first and second display boards are curved to have a common curvature in a horizontal direction, and the plurality of monitors are arranged side by side in the horizontal direction along the first display board.

According to the fourth disclosure, since the plural monitors arranged side by side in the horizontal direction are disposed along the first display board even though the first display board is curved to have a curvature common to the second display board, a wide display range for the vehicle information displayed by the respective transmission display portions can be ensured. According to this structure, when the plural general-purpose monitors having flat screens are used even without a monitor having a screen curved along the first and second display boards, the occupant's attention to the boundary portions between the respective transmission display portions can be suppressed while the display of the vehicle information over a wide range is realized. Accordingly, the appearance of the display performed by the vehicular display device, which is suitable for mass production, can be improved.

EMBODIMENTS FOR CARRYING OUT INVENTION

Figure 1:
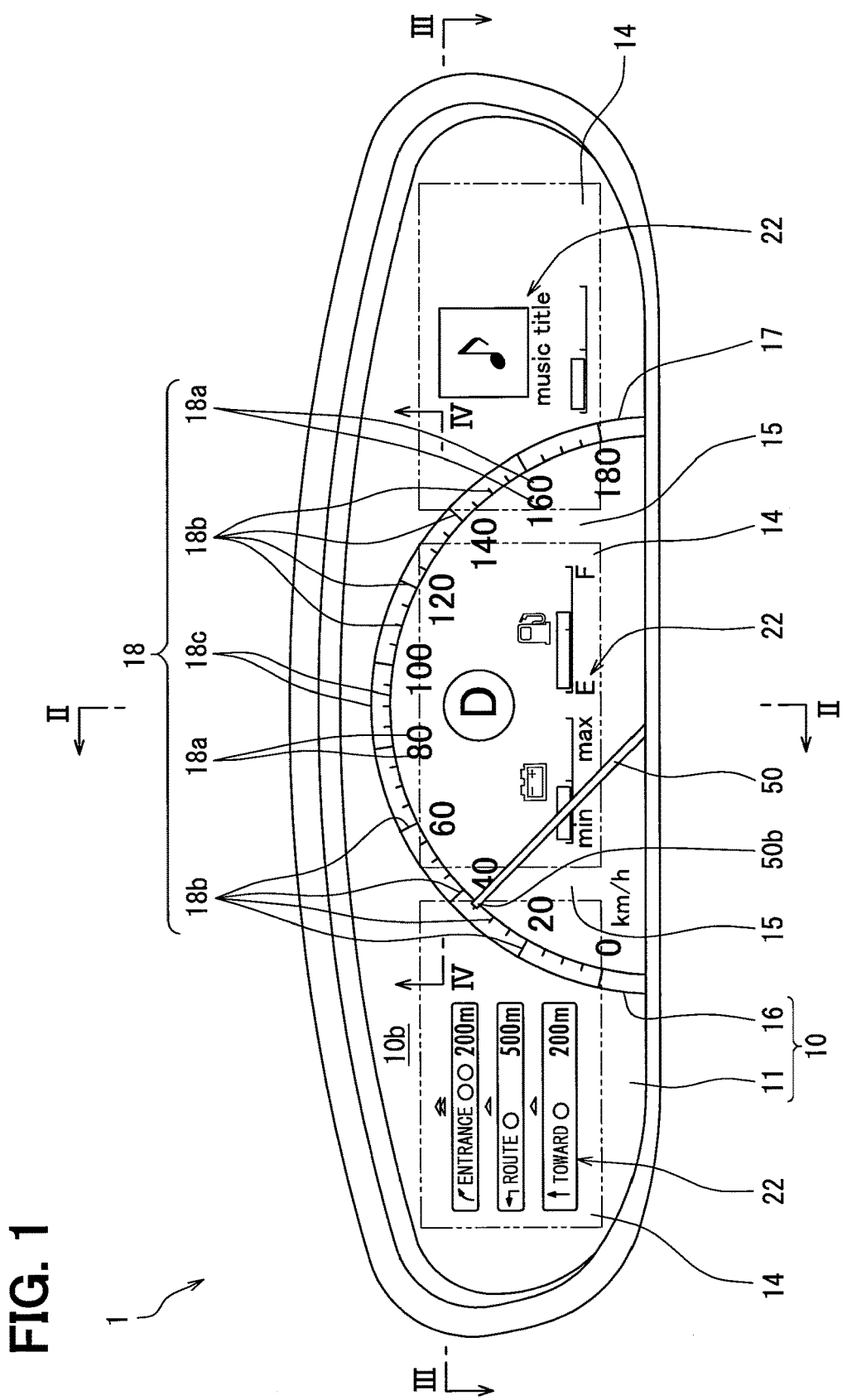
FIG. 1 is a front view showing a vehicular display device according to a first embodiment.

A plurality of embodiments of the present disclosure will be described below with reference to the drawings. Meanwhile, since corresponding components of the respective embodiments are denoted by the same reference numerals, the repeated description thereof may be omitted. When only a part of the structure is described in each embodiment, the structure of the other embodiment having been previously described can be applied to the other part of the structure. Further, structures described clearly in the description of the respective embodiments can be combined with each other, and the structures of plural embodiments can also be partially combined with each other when a problem does not particularly occur in combination even though the combination is not described clearly.

First Embodiment

Figure 2:
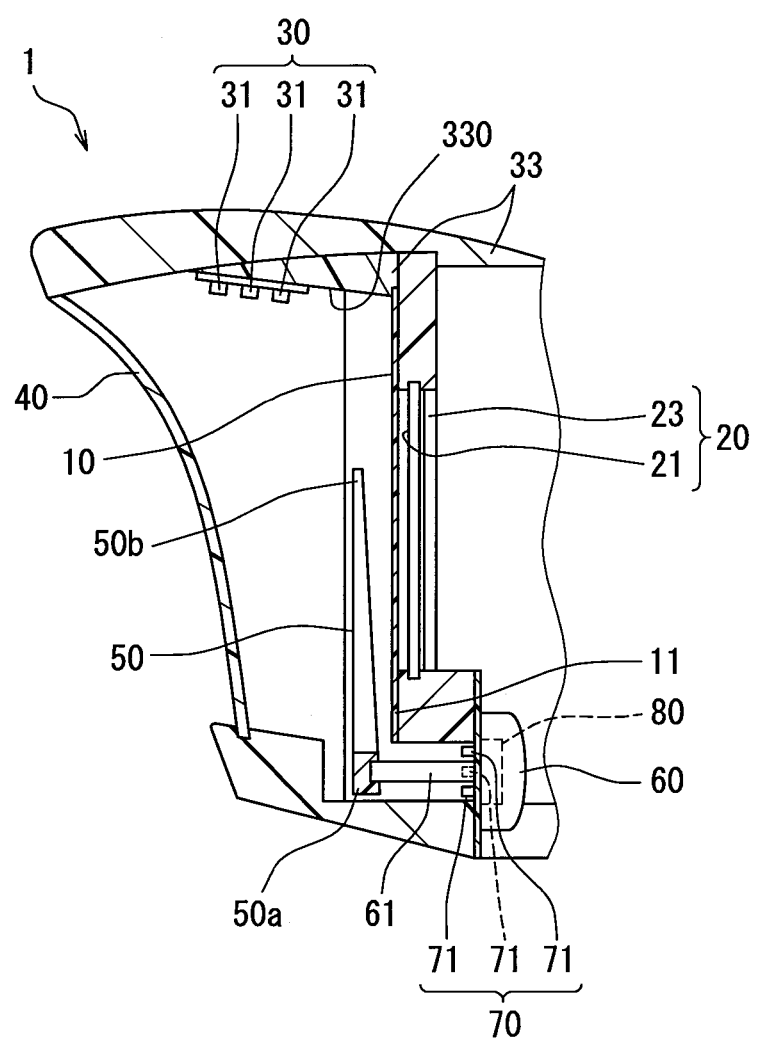
FIG. 2 is a cross-sectional view taken along line II-II of FIG. 1.
Figure 3:
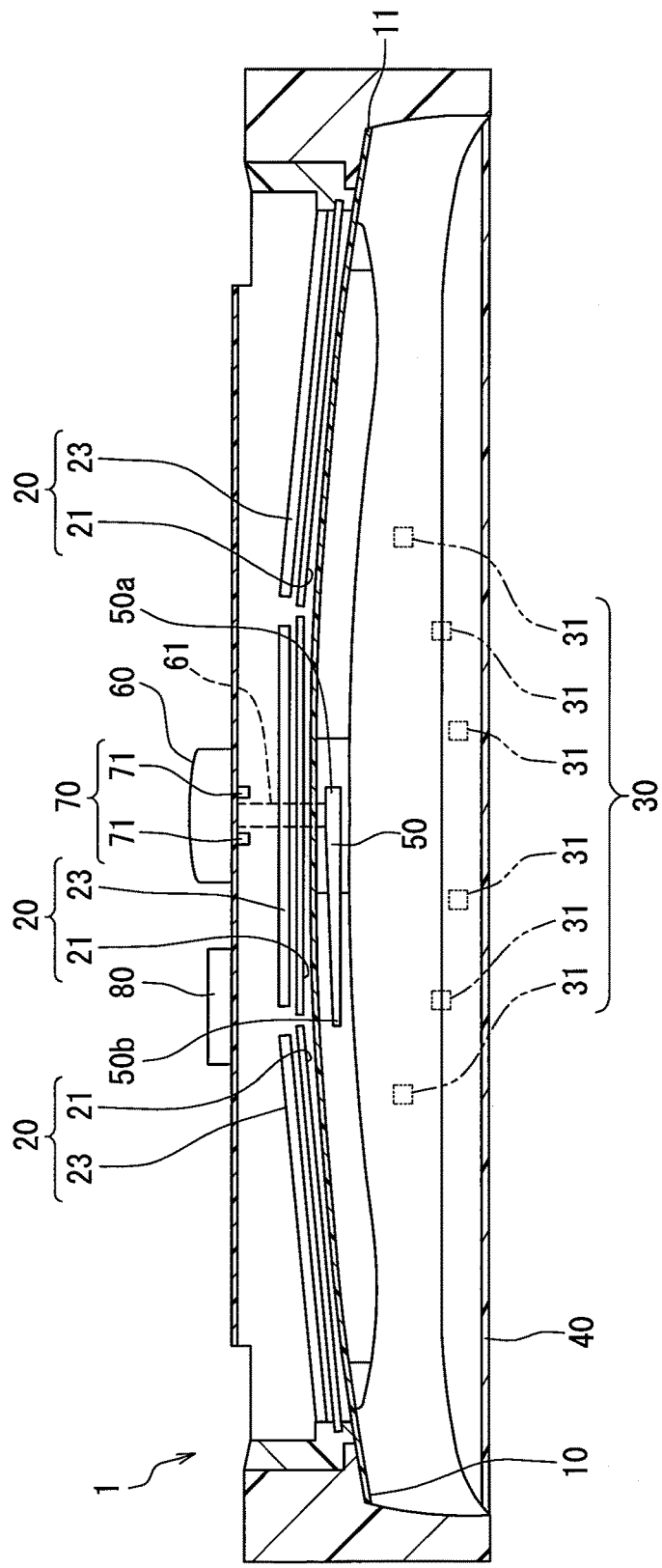
FIG. 3 is a cross-sectional view taken along line III-III of FIG. 1.

As shown in FIGS. 1 to 3, a vehicular display device 1 according to a first embodiment of this disclosure is a combination meter that displays information an occupant seated on a seat in a vehicle, and is installed on an instrument panel in the vehicle. Meanwhile, a "horizontal direction"

and a "vertical direction" of the device 1 substantially correspond to a horizontal direction and a vertical direction of the vehicle in FIG. 1, respectively. A "front side" of the device 1 means a left side in FIG. 2 on which information is displayed to the occupant in the vehicle and a lower side in FIG. 3, that is, a side that is viewed by the occupant. A "rear side" of the device 1 means a right side in FIG. 2 that is opposite to the side on which information is displayed to the occupant in the vehicle and an upper side in FIG. 3.

The device 1 includes a display board 10, monitors 20, an index light source 30, a cover 40, a rotary pointer 50, a driving source 60, a pointer light source 70, and a control circuit 80.

Figure 4:
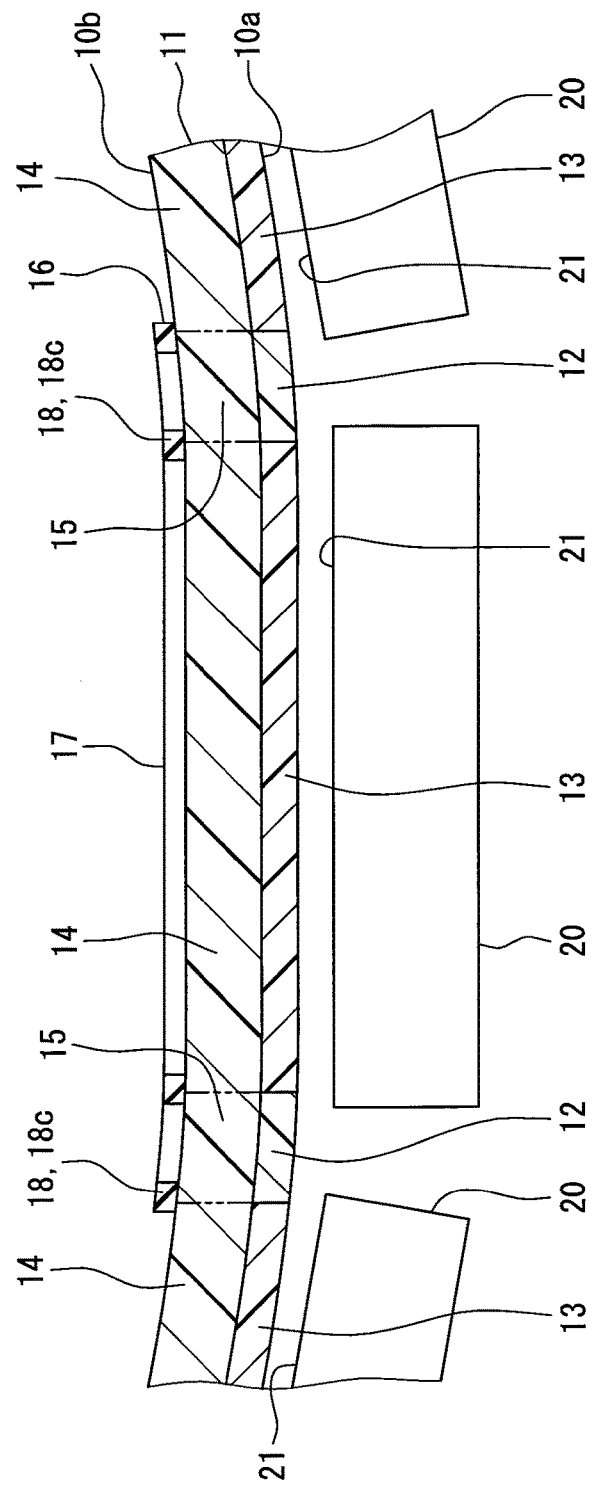
FIG. 4 is a cross-sectional view taken along line IV-IV of FIG. 1.

As shown in FIGS. 1 to 4, the display board 10 is formed in the shape of a plate and a translucent base material 11, which is colorless and transparent, such as a polycarbonate resin, is used as a main body of the display board 10. Since the display board 10 is curved so as to have a curvature in the horizontal direction, the display board 10 is concave so that the middle portion of the display board 10 is positioned closer to the rear side of the device 1 than both end portions thereof in the horizontal direction. As shown in FIG. 4, the display board 10 includes light-shielding layers 12 and smoke layers 13 that are provided on a rear surface 10*a* thereof.

A non-translucent layer made of, for example, an acrylic resin, a vinyl chloride resin, a polyester resin, or the like and colored with black as a dark color is laminated on the translucent base material 11 by printing or the like, so that the light-shielding layers 12 are formed. Since the light-shielding layers 12 are disposed on plural portions of the display board 10 at intervals in the horizontal direction, plural transmission display portions 14, which transmit light from the rear side, are ensured in the translucent base material 11. The respective transmission display portions 14 are ensured so as to have substantially the same size and a rectangular shape, and are arranged side by side at predetermined intervals in the horizontal direction. Meanwhile, the outlines of the transmission display portions 14 are imaginarily shown in FIGS. 1 and 4 by a two-dot chain line.

A translucent layer made of, for example, an acrylic resin, a vinyl chloride resin, a polyester resin, or the like and colored with gray as a dark color is laminated on the translucent base material 11 by printing or the like, so that the smoke layers 13 are formed as shown in FIG. 4. The plural smoke layers 13 are provided adjacent to the light-shielding layers 12 so as to cover the entire corresponding transmission display portions 14 of the translucent base material 11 from the rear side. Each of the smoke layers 13 transmits the light, which is emitted from the rear side, to the transmission display portion 14 provided on the front side. Due to the above-mentioned structure, the light-shielding layers 12, which are positioned between the respective smoke layers 13, allow boundary portions 15 of the translucent base material 11 between the transmission display portions 14 to function as non-display portions that do not perform both transmission display and light-emitting display.

As shown in FIGS. 1 and 4, the display board 10 includes a fluorescent layer 16 that is provided on a front surface 10*b* thereof. A translucent layer, which is made of an acrylic resin in which, for example, fluorite powder is melted and is colorless and transparent, is laminated on the translucent base material 11 by printing or the like, so that the fluorescent layer 16 is formed. The fluorescent layer 16 partially covers the display board 10 and forms an index display portion 17 that displays a vehicle state value. The vehicle state value is a physical quantity that represents the operational state of a vehicle, and is particularly the traveling speed of the vehicle in this embodiment.

The display of the vehicle state value is realized by an index row 18 of the index display portion 17 that is formed over the front side of the respective transmission display portions 14 which interpose the boundary portions therebetween. The index row 18 is formed of a combination of plural indexes, specifically, numerals 18*a*, scales 18*b*, and guides 18*c*. The numerals 18*a* and the scales 18*b* are disposed on different arcs at intervals by a predetermined value. The guides 18*c* are formed along two kinds of large and small arcs, and are provided on the outside of the respective numerals 18*a* in a radial direction so that the respective scales 18*b* are interposed between the guides 18*c* in the radial direction. Due to the shapes of these components 18*a*, 18*b*, and 18*c*, the entire shape of the index row 18 extends from the front side of the middle transmission display portion 14 to the front sides of both side transmission display portions 14. It should be noted that, in FIG. 1, only a part of the components 18*a*, 18*b*, and 18*c* are denoted by reference numerals.

As shown in FIGS. 2 to 4, the monitor 20 is formed of, for example, a liquid crystal panel, an organic EL panel, or the like, and plural monitors 20 are arranged side by side in the horizontal direction. The respective monitors 20 are disposed along the display board 10 in the rear of the transmission display portions 14 that individually correspond to the monitors 20. Due to this disposition, the monitor 20 positioned on the left side of the middle monitor 20 is inclined so that a left end portion thereof is closer to the front side, and the monitor 20 positioned on the right side of the middle monitor 20 is inclined so that a right end portion thereof is closer to the front side.

Screens 21 of the respective monitors 20 are formed so as to have substantially the same size and a rectangular planar shape, and display images. As shown in FIGS. 2 and 3, a backlight 23 of each monitor 20 is formed of a combination of a light guide plate and a light emitting element such as light emitting diodes (LEDs) emitting visible light. Due to this structure, visible light emitted from the backlight 23 is applied to the screen 21 of each monitor 20 provided on the front side. Accordingly, the screens 21 are individually displayed and transmitted by the corresponding transmission display portions 14, respectively. Meanwhile, the backlight 23 emits white visible light having a wavelength in the range of 450 to 660 nm from which, for example, near-ultraviolet light is cut.

Since the screen 21 of each monitor 20 is displayed and transmitted from the rear side by the transmission display portion 14 in this way, the display state of the vehicle information 22 shown in FIGS. 1 and 5 to 7 is achieved. Here, the vehicle information 22 is information of which the type is fixedly or switchably displayed on each monitor, among plural kinds of information relevant to the vehicle or the driving of the vehicle; and FIGS. 1 and 5 to 7 show the display state of the vehicle information 22.

Figure 5:
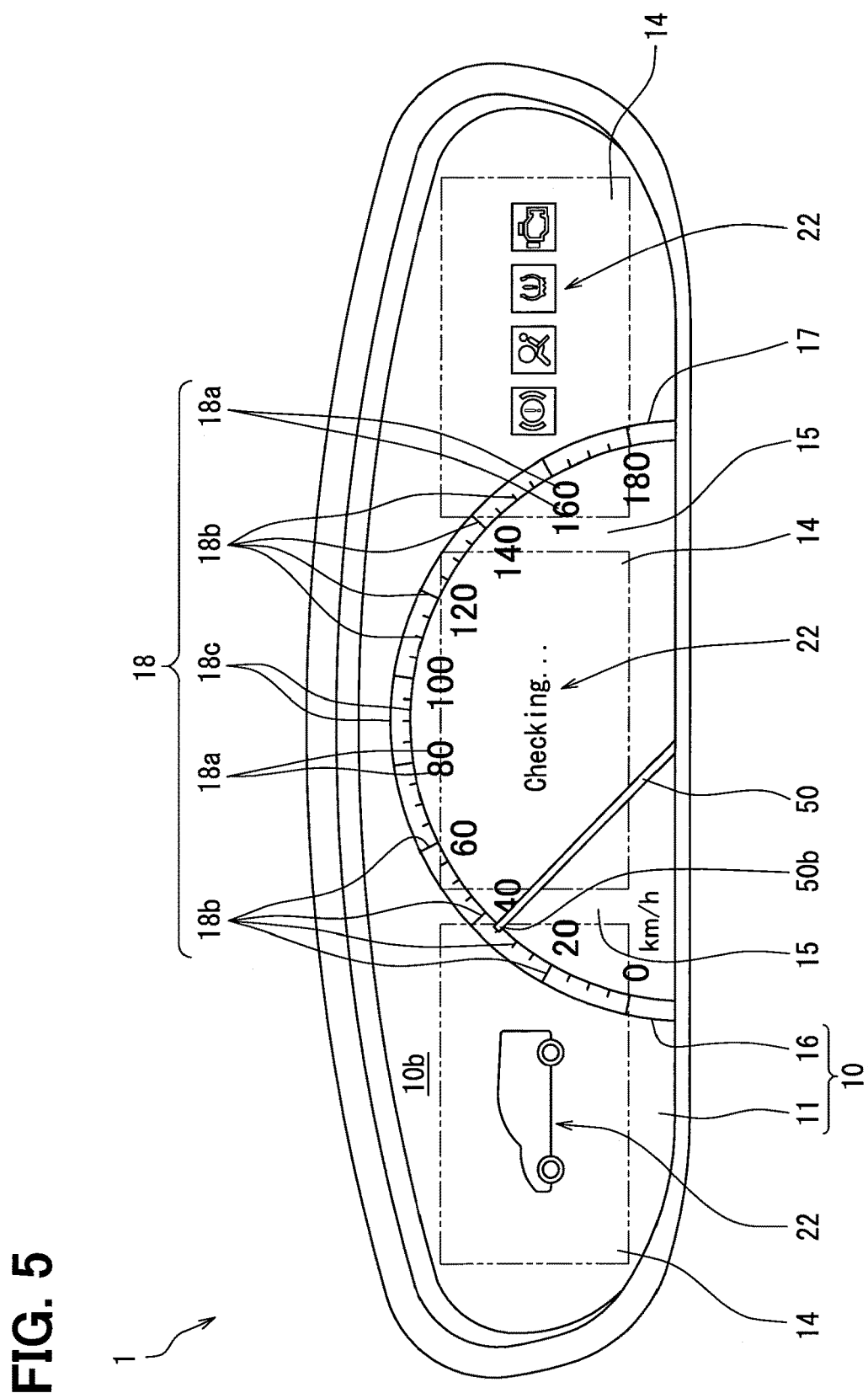
FIG. 5 is a front view showing a display state different from a display state of FIG. 1.

For example, an initial display state of FIG. 5 is realized immediately after an engine switch of the vehicle is turned on. Specifically, in an initial display state, a design or a letter as the vehicle information 22, which informs the occupant of the initial check of the vehicle, is displayed by each transmission display portion 14.

A normal display state of FIG. 1 is realized in a period in which the engine switch continues to be turned on after the initial display state. Specifically, in the normal display state, navigation information as the vehicle information 22 is displayed by the left side transmission display portion 14 and audio information as the vehicle information 22 is displayed by the right side transmission display portion 14. In addition, in the normal display state, shift range information, battery information, and information about the amount of residual fuel as the vehicle information 22 are displayed by the middle transmission display portion 14.

Figure 6:
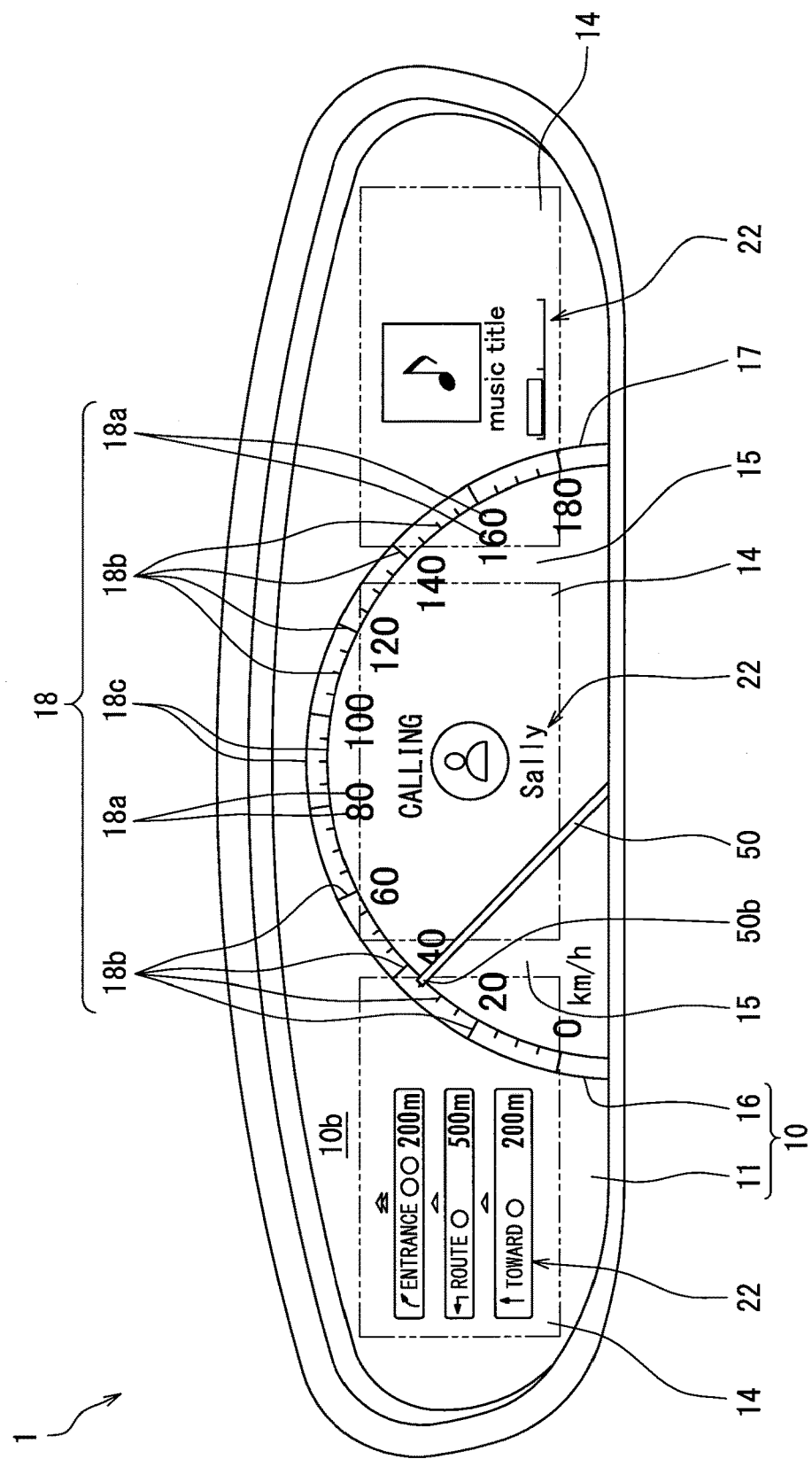
FIG. 6 is a front view showing a display state different from the display states of FIGS. 1 and 5.
Figure 7:
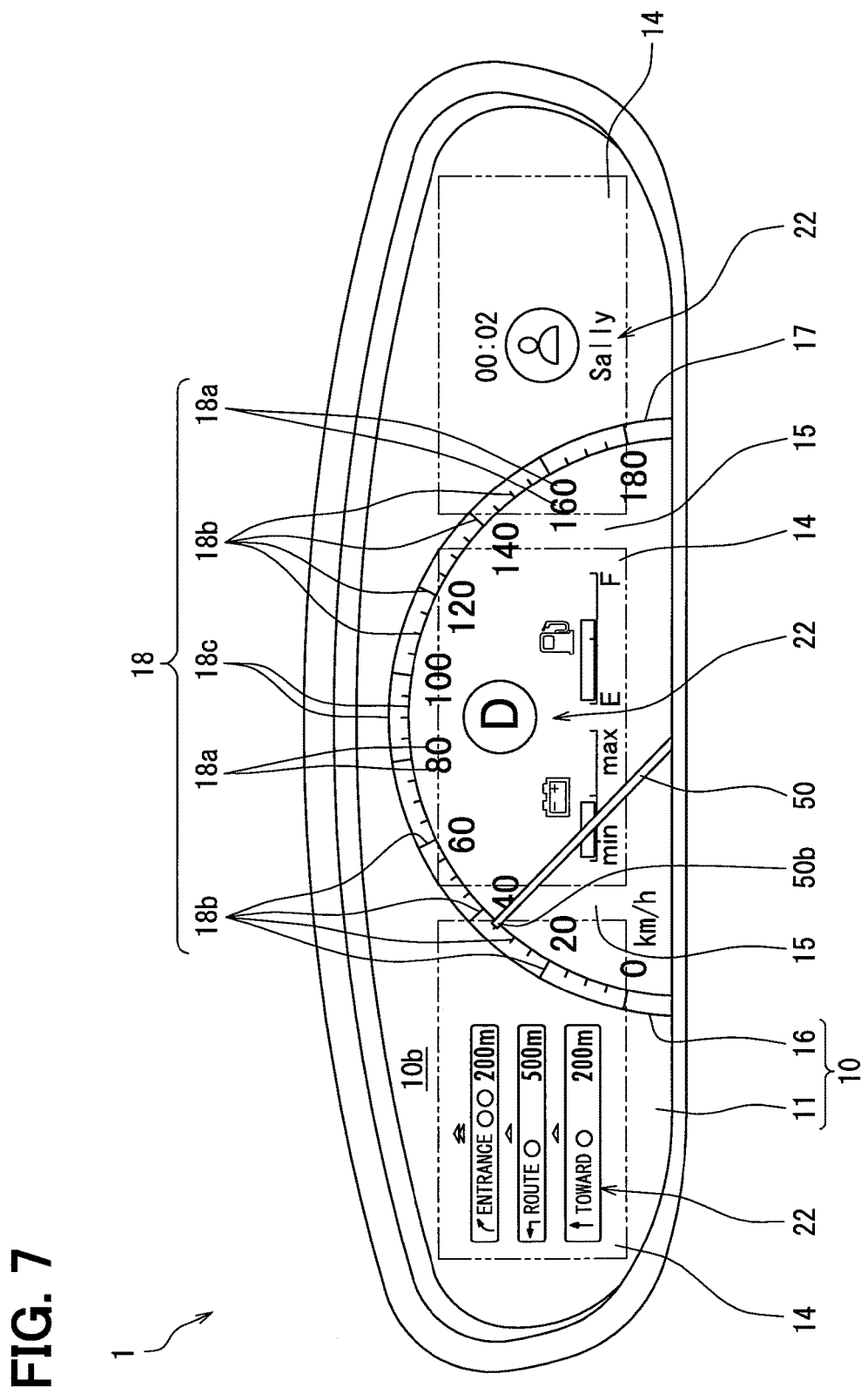
FIG. 7 is a front view showing a display state different from the display states of FIGS. 1, 5, and 6.

A communication display state of FIGS. 6 and 7 is realized while the vehicle communicates with a portable terminal brought into the vehicle by the occupant in a period in which the engine switch continues to be turned on. Particularly, in this embodiment, a state is temporarily switched to a first communication display state of FIG. 6 from the initial display state of FIG. 1, is switched to a second communication display state of FIG. 7 from the first communication display state, and then returns to the normal display state with the end of the communication. Specifically, in the first communication display state, navigation information and audio information are displayed by the left and right side transmission display portions 14 as the same vehicle information 22 as the information in the immediately preceding normal display state, respectively. In addition, in the first communication display state, communication information, which informs the occupant of a communication state, is displayed by the middle transmission display portion 14 as the vehicle information 22 that is different from the information in the immediately preceding normal display state. Meanwhile, in the second communication display state, navigation information is displayed by the left side transmission display portion 14 as the same vehicle information 22 as the information in the immediately preceding first communication display state. In addition, in the second communication display state, shift range information and the like are displayed by the middle transmission display portion 14 as the same vehicle information 22 as the information in the normal display state that is not yet switched to the immediately preceding first communication display state. Moreover, the communication information as the vehicle information 22, which is displayed by the middle transmission display portion 14 in the immediately preceding first communication display state, is displayed by the right side transmission display portion 14 in the second communication display state. In this case, the display of the communication information on these screens 21 is controlled so that the communication information is gradually moved to the screen 21 of the right side monitor 20 from the screen 21 of the middle monitor 20. The communication information is displayed as animations by this control so as to be moved between the adjacent transmission display portions 14.

Figure 8:
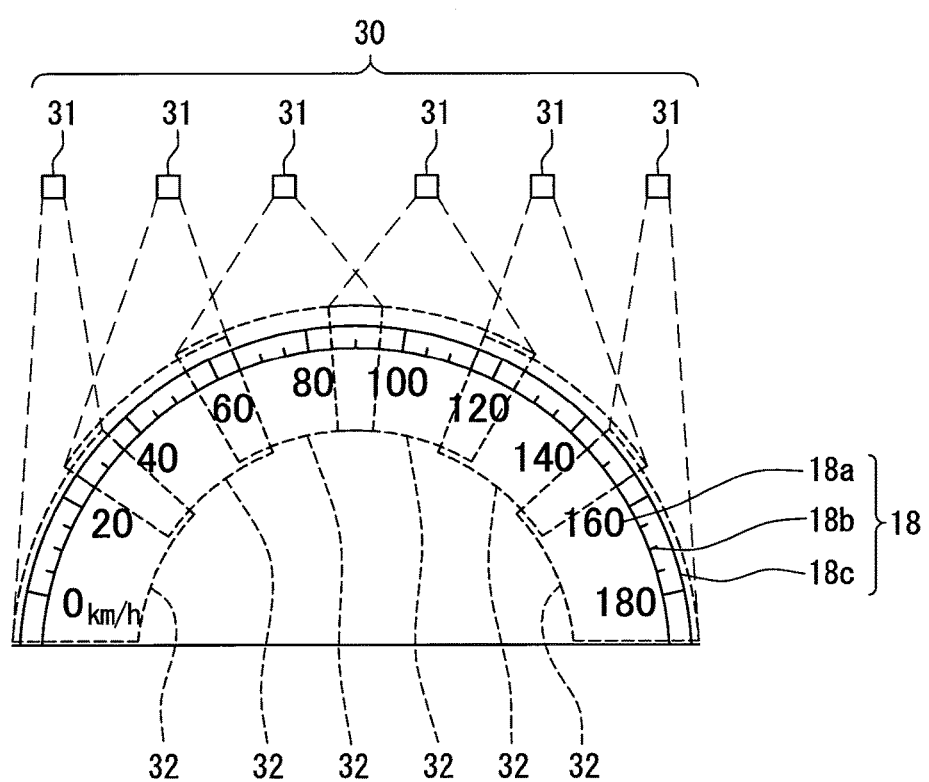
FIG. 8 is a schematic view showing the operation of the first embodiment.

As shown in FIGS. 2 and 3, the index light source 30 includes plural light emitting elements 31 such as light emitting diodes (LEDs). The respective light emitting elements 31 are disposed on a portion 330, which is positioned obliquely above and in front of a path along which, particularly, a tip portion 50*b* of the rotary pointer 50 is moved, of a hood part (facing part) 33 disposed so as to surround the periphery of the display board 10. The respective light emitting elements 31 are disposed at intervals in the horizontal direction. A range in which the light emitting elements 31 are disposed in the horizontal direction (that is, a range between the leftmost light emitting element 31 and the rightmost light emitting element 31) is set according to a range in which the index display portion 17 is formed (that is, a range in which the index row 18 extends). Due to this setting, in the index row 18, as schematically shown in FIG. 8, irradiation target areas 32, which are irradiated with ultraviolet light from the front side of the display board 10 by the respective light emitting elements 31 turned on, are offset from each other in an arc direction of the index row 18. However, the irradiation target areas 32, which are adjacent to each other in the arc direction of the index row 18, are offset from each other so that end portions of both the irradiation target areas overlap each other.

Due to this disposition, the index light source 30 irradiates the respective irradiation target areas 32 of the index row 18 with ultraviolet light from the respective light emitting elements 31, which are turned on, to illuminate the entire index display portion 17 in all the display states of FIGS. 1 and 5 to 7. In this case, the index row 18 formed of the fluorescent layer 16 receives ultraviolet light and is excited. As a result, the index row 18 is irradiated. Meanwhile, each light emitting element 31 emits near-ultraviolet light, which has a wavelength in the range of, for example, about 300 to 400 nm, preferably, a wavelength of about 380 nm, of ultraviolet light. Further, the index row 18, which receives the near-ultraviolet light and is irradiated, is provided with the fluorescent layer 16 so that monochromatic visible light, such as green or blue visible light, is emitted at a specific wavelength in the range of, for example, 450 to 660 nm.

As shown in FIGS. 2 and 3, the cover 40 is made of smoke glass, which is colored with black or gray, or the like in the form of a plate. The cover 40 is disposed in front of the display board 10. The cover 40 is inclined while being curved forward toward the upper side. Since the cover 40 reflects ultraviolet light emitted from the index light source 30 toward the index display portion 17 positioned in the rear thereof due to this curved and inclined shape, the cover 40 limits the transmittance of the ultraviolet light to the front side in the range of, for example, about 60% to 70%. Meanwhile, when visible light emitted from the transmission display portion 14 and visible light emitted from the rotary pointer 50 to be described below are transmitted to the front side, the cover 40 limits the transmittance of the visible light in the range of, for example, about 30% to 50%.

As shown in FIGS. 1 to 3, the rotary pointer 50 is made of, for example, a translucent material, such as an acrylic resin, in the form of an elongated needle that is colorless and transparent. The rotary pointer 50 is disposed in front of the display board 10 and in the rear of the cover 40. The rotary pointer 50 is provided so as to be rotatable about a base end portion 50*a* thereof. The tip portion 50*b* of the rotating rotary pointer 50 moves in front of the index display portion 17 to indicate the numeral 18*a* or the scale 18*b* of the index row 18. The rotating range of the rotary pointer 50, which realizes this indication, is formed over the front side of the respective transmission display portions 14, as in the case of the index row 18.

As shown in FIGS. 2 and 3, the driving source 60 is formed of an electric actuator such as a stepping motor. The driving source 60 is disposed in the rear of the display board 10. Since a driving shaft 61 of the driving source 60 is mounted on the base end portion 50*a* through a lower portion of the display board 10, the rotary pointer 50 can be rotationally driven.

The pointer light source 70 includes plural light emitting elements 71 such as light emitting diodes (LEDs). The respective light emitting elements 71 are disposed in the rear of the display board 10. The respective light emitting elements 71 illuminates the base end portion 50*a* with visible light through the lower portion of the display board 10 to illuminate the entire rotary pointer 50 in a transmission manner. Meanwhile, each of the light emitting elements 71 emits white visible light having a wavelength in the range of, for example, 450 to 660 nm.

The control circuit 80 is formed of an electronic circuit such as a microcomputer. The control circuit 80 is disposed in the rear of the display board 10. The control circuit 80 is connected to the electric elements 20, 30, 60, and 70 of the device 1. In addition, the control circuit 80 is also connected to various vehicle sensors (not shown) relevant to the vehicle state value and the vehicle information 22. Due to this connection, the control circuit 80 frequently controls the display of the vehicle information 22 on the screens 21, the turn-on/off of the backlights 23 and the respective light emitting elements 31 and 71 of the light sources 30 and 70, and the rotational driving of the rotary pointer 50 performed by the driving source 60 on the basis of output signals of the various vehicle sensors.

Effects of the above-mentioned first embodiment will be described below.

The index row 18 on the display board 10 formed by the index display portion 17 is irradiated with the ultraviolet light emitted from the index light source 30 in front of the respective transmission display portions 14 that individually transmit and display the screens 21 of the plural monitors 20 from the rear side and are arranged side by side. Accordingly, the index row 18 is irradiated. According to this structure, the occupant is less likely to pay attention to the boundary portions 15 between the respective transmission display portions 14 that perform transmission display in the rear of the index row 18 irradiated than the index row 18 that is irradiated. As a result, since a sense of incongruity, which is caused when the boundary portions 15, i.e., discontinuous portions of the transmission display of the vehicle information 22, between the respective transmission display portions 14 are viewed by the occupant, can be reduced as much as possible, the appearance of display performed by the device 1 can be improved.

Further, since the plural monitors 20 arranged side by side in the horizontal direction are disposed along the display board 10 even though the display board 10 is curved to have a curvature, a wide display range for the vehicle information 22 displayed by the respective transmission display portions 14 can be ensured. According to this structure, when plural general-purpose monitors 20 having flat screens 21 are used even though a monitor having a screen curved along the display board 10 is not used, the occupant's attention to the boundary portions 15 between the respective transmission display portions 14 can be suppressed while the display of the vehicle information 22 over a wide range is realized. Accordingly, the appearance of the display performed by the device 1, which is suitable for mass production, can be improved.

Furthermore, when the vehicle information 22 is displayed as an animation so as to move between the adjacent transmission display portions 14, the occupant is less likely to pay attention to the boundary portion due to the crossing of the index row 18 although the boundary portion 15 between these transmission display portions 14 is a discontinuous portion of the display. According to this structure, the appearance of the display performed by the device 1 can be improved without the inhibition of a presentation effect of the animation display.

Moreover, the rotating range of the rotary pointer 50, which indicates the index row 18 in front of the index display portion 17, and the index row 18 are formed over the front side of the respective transmission display portions 14. According to this structure, the occupant is more likely to pay attention to the index row 18, which is irradiated, and the rotary pointer 50, which indicates the index row 18 than the boundary portions 15 between the respective transmission display portions 14. Accordingly, this structure can contribute to the improvement of the appearance of the display performed by the device 1.

Second Embodiment

Figure 9:
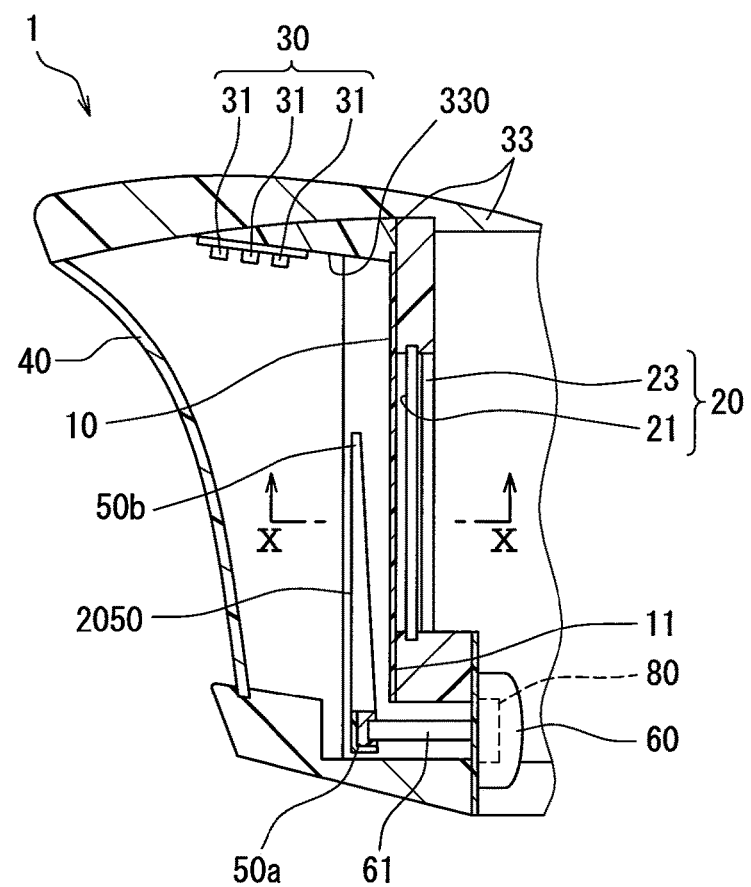
FIG. 9 is a view showing a vehicular display device according to a second embodiment and is a cross-sectional view corresponding to FIG. 2.
Figure 10:
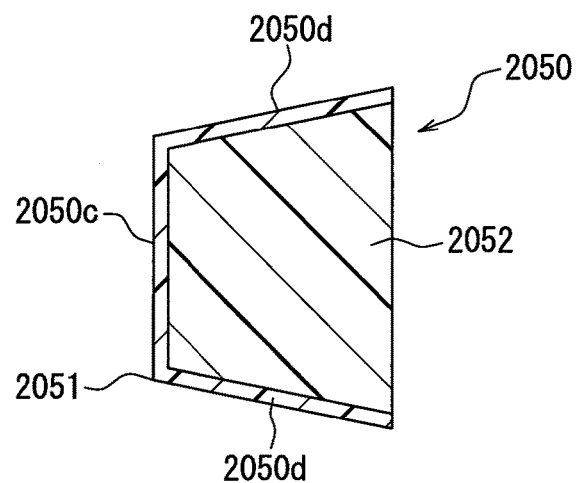
FIG. 10 is a cross-sectional view taken along line X-X of FIG. 9.

As shown in FIGS. 9 and 10, a second embodiment of this disclosure is a modification of the first embodiment. In the second embodiment, the pointer light source 70 of FIG. 2 of the first embodiment is not provided as shown in FIG. 9 and a fluorescent layer, which emits light by using ultraviolet light, is formed on a rotary pointer 2050. Specifically, a fluorescent layer 2051 is formed on a front surface 2050c and both side surfaces 2050d of the rotary pointer 2050 as shown in FIG. 10. A translucent layer, which is made of an acrylic resin in which, for example, fluorite powder is melted and is colorless and transparent, is laminated on a translucent base material 2052 serving as a base material of the rotary pointer 2050 by printing or the like, so that the fluorescent layer 2051 is formed. The fluorescent layer 2051 is irradiated with ultraviolet light emitted from the respective light emitting elements 31 of the index light source 30, so that the entire rotary pointer 2050 is illuminated. In this case, the fluorescent layer 2051 receives ultraviolet light, particularly, near-ultraviolet light and is excited as in the case of the index row 18 of the index display portion 17. As a result, the fluorescent layer 2051 is irradiated. Meanwhile, the fluorescent layer 2051, which is irradiated in this way, is formed so as to emit white visible light having a wavelength in the range of, for example, 450 to 660 nm.

According to the second embodiment, while the rotary pointer 2050 disposed in front of the index display portion 17 is irradiated with ultraviolet light emitted from the index light source 30, the rotary pointer 2050 is rotated. Accordingly, the occupant is likely to pay attention to the rotary pointer 2050 together with the index row 18 that is irradiated. According to this structure, an effect of suppressing the occupant's attention to the boundary portions 15 between the respective transmission display portions 14 is enhanced. Accordingly, this structure can contribute to the improvement of the appearance of the display performed by the device 1.

Third Embodiment

Figure 11:
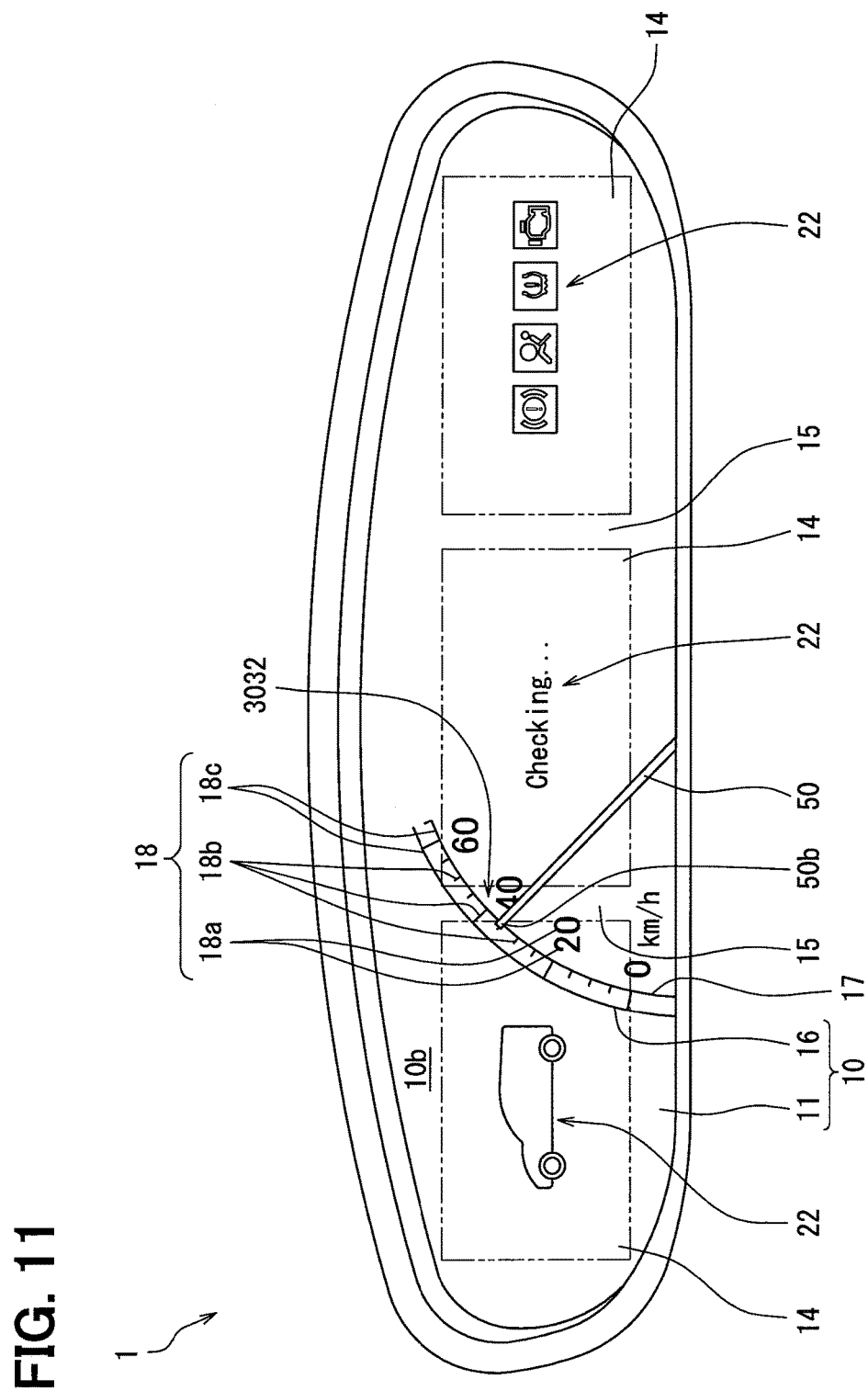
FIG. 11 is a view showing a vehicular display device according to a third embodiment and is a front view corresponding to FIG. 5.
Figure 12:
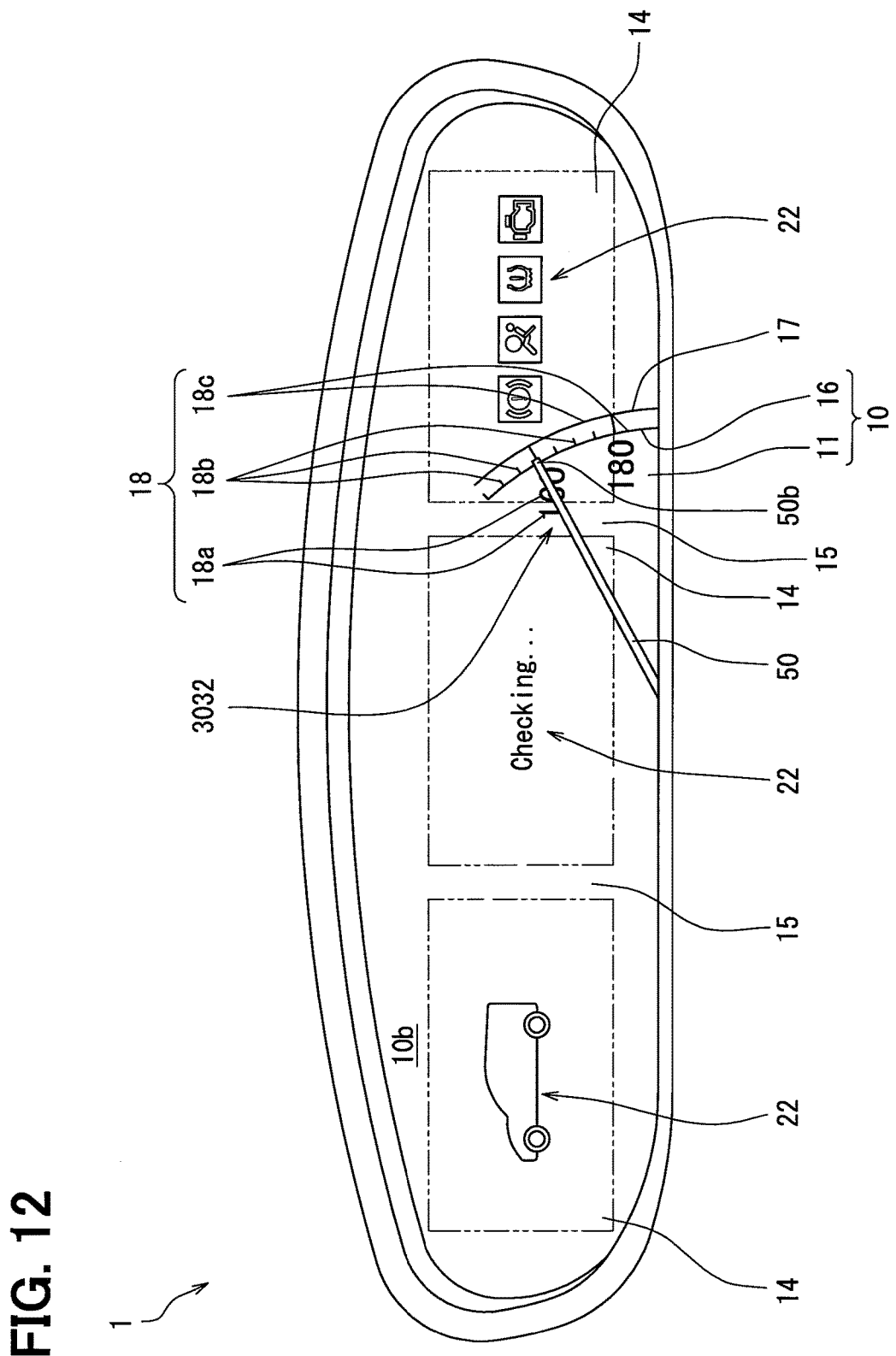
FIG. 12 is a front view showing the operation of the third embodiment.

As shown in FIGS. 11 and 12, a third embodiment of this disclosure is a modification of the first embodiment. In an initial display state of the third embodiment, the respective light emitting elements 31 of the index light source 30 (not shown in FIGS. 11 and 12) are turned on by current flow control from the control circuit 80 as the rotary pointer 50 indicates irradiation target areas 3032 set as in the first embodiment. In other words, the respective light emitting elements 31 of the index light source 30 are turned off as a destination of the rotary pointer 50 deviates from the respective irradiation target areas 3032.

As described above, each of the plural light emitting elements 31 irradiating the respective irradiation target areas 3032, which are offset from each other, with ultraviolet light is turned on when the corresponding irradiation target area 3032 is indicated by the rotary pointer 50. As a result, the light emitting element irradiates the irradiation target area 3032 corresponding to the destination. According to this structure, since the light-emitting display of only the irradiation target area 3032 of the index row 18, which corresponds to the destination of the rotary pointer 50, is realized, the occupant is likely to pay attention to the destination.

Accordingly, since an effect of suppressing the occupant's attention to the boundary portions 15 between the respective transmission display portions 14 and a presentation effect caused by the change of the destination of attention can be obtained, the appearance of the display performed by the device 1 can be improved.

Fourth Embodiment

Figure 13:
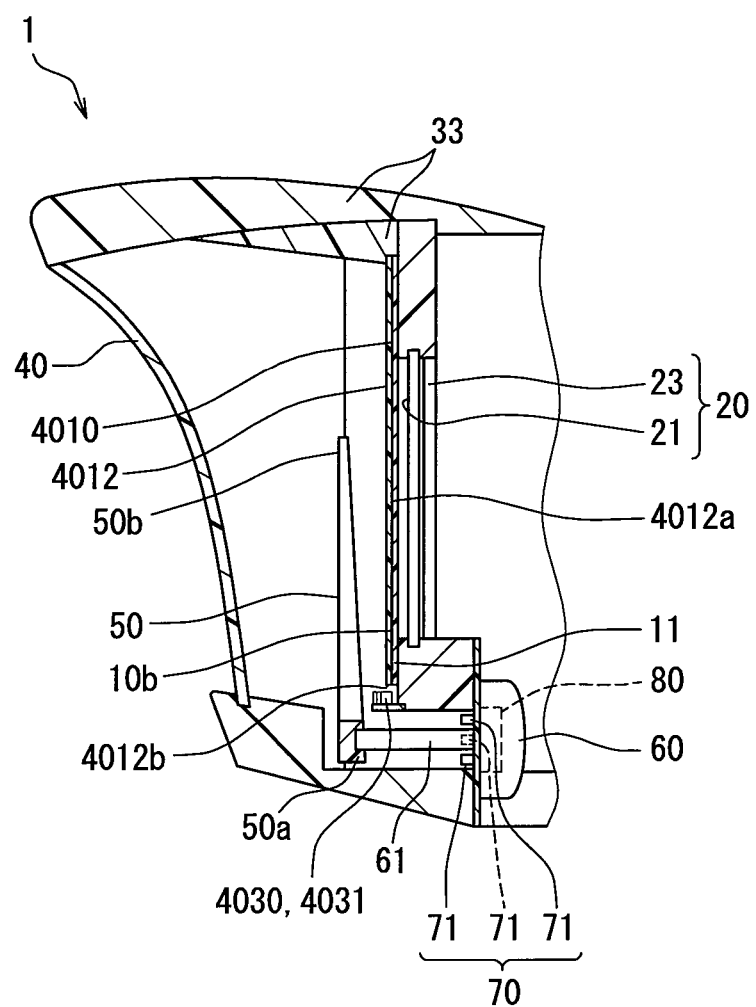
FIG. 13 is a view showing a vehicular display device according to a fourth embodiment and is a cross-sectional view corresponding to FIG. 2.
Figure 14:
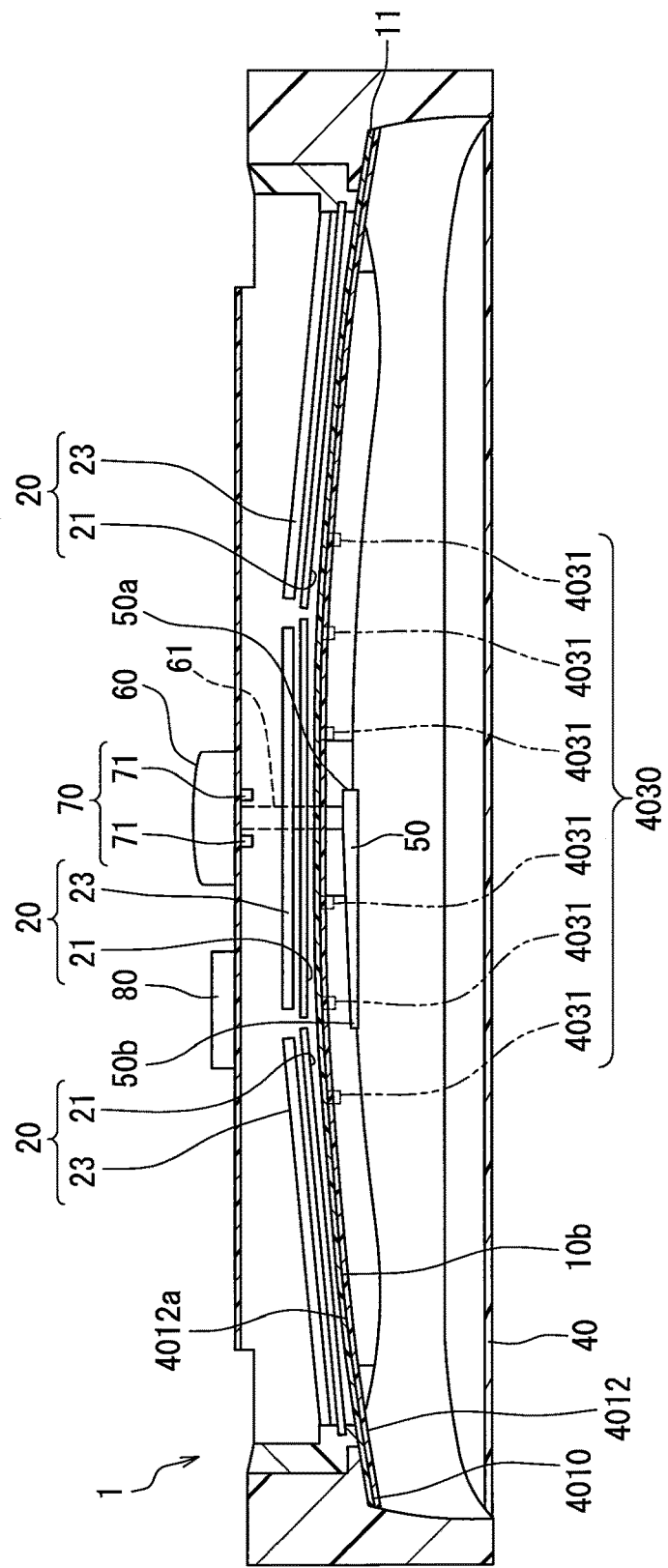
FIG. 14 is a view showing the vehicular display device according to the fourth embodiment and is a cross-sectional view corresponding to FIG. 3.

As shown in FIGS. 13 and 14, a fourth embodiment of this disclosure is a modification of the first embodiment. A device 1 of the fourth embodiment includes a first display board 4010 and a second display board 4012 instead of the display board 10 of the first embodiment. The first display board 4010 has substantially the same structure as the display board 10 of the first embodiment except that the first display board 4010 does not include the fluorescent layer 16 forming the index row 18. Accordingly, the respective monitors 20 of the fourth embodiment are disposed along the curved first display board 4010 in the rear of the transmission display portions 14 that individually correspond to the monitors 20.

The second display board 4012 is made of a translucent material, which is colorless and transparent, such as an acrylic resin, in the form of a plate and overlaps a front surface 10b of the first display board 4010. Since the second display board 4012 is curved so as to have a curvature common to the first display board 4010 in the horizontal direction, the second display board 4012 is concave so that the middle portion of the second display board 4012 is positioned closer to the rear side of the device 1 than both end portions thereof in the horizontal direction.

Figure 15:
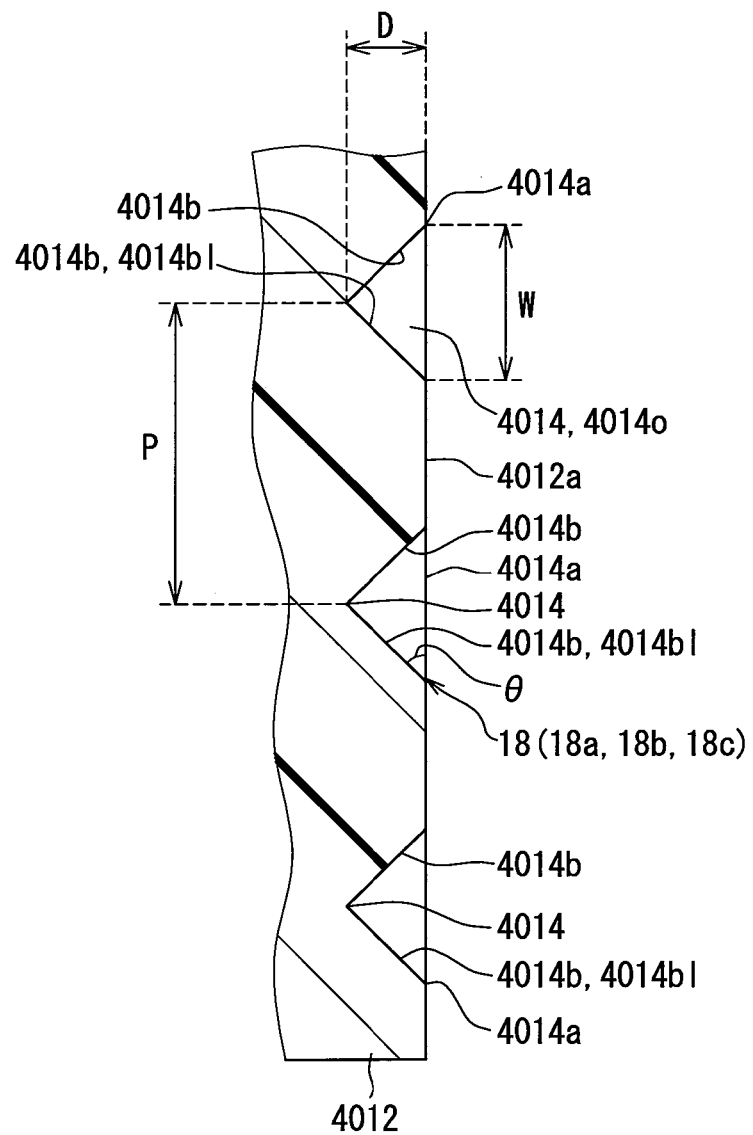
FIG. 15 is an enlarged cross-sectional view showing main parts of FIG. 13.

The second display board 4012 includes concave surface portions 4014 shown in FIG. 15 in order to form the same index row 18 of the index display portion 17 as that of the first embodiment (see FIGS. 1 and 5 to 7). Specifically, plural concave surface portions 4014 are arranged to form each of numerals 18a, scales 18b, and guides 18c that are combined as the index row 18. Even in any of the numerals 18a, the scales 18b, and the guides 18c, the concave surface portions 4014 are arranged in the horizontal direction and the vertical direction. Further, the outline of each of the numerals 18a, the scales 18b, and the guides 18c is formed by a group of concave surface portions 4014o that do not include the concave surface portions 4014 adjacent to each other in any of the horizontal direction and the vertical direction. Meanwhile, in the following description, the concave surface portions 4014 forming the numerals 18a will be described in detail and the detailed description of the concave surface portion 4014 forming each of the scales 18b and the guides 18c will be omitted.

Figure 16:
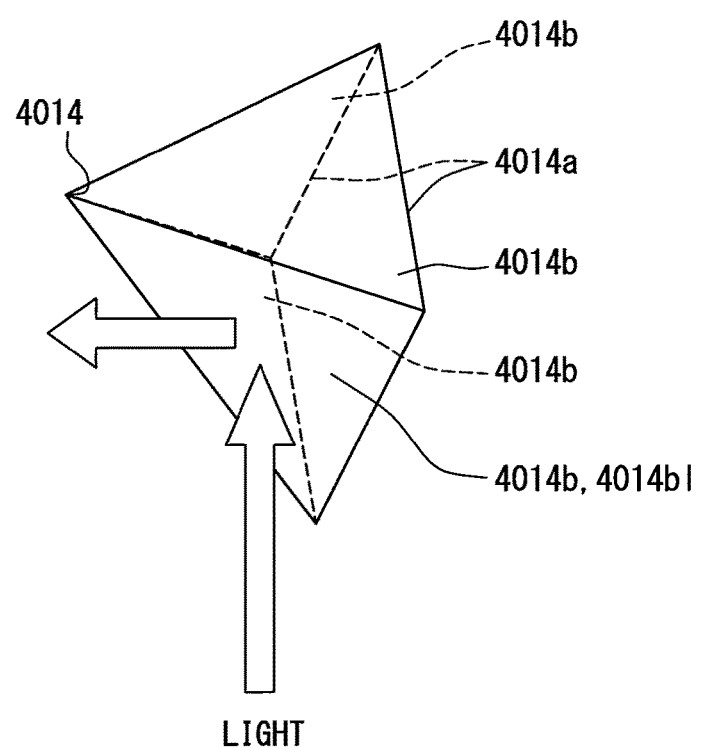
FIG. 16 is a perspective view of a concave surface portion of the vehicular display device according to the fourth embodiment.

Each of the concave surface portions 4014 forming the numerals 18a is recessed forward from a rear surface 4012a (see FIGS. 13 and 14) of the second display board 4012, which comes into contact with the front surface 10b of the first display board 4010, in the shape of a pyramid having a V-shaped section. Here, as shown in FIGS. 15 and 16, each concave surface portion 4014 of the fourth embodiment is recessed in the shape of a square pyramid of which two opposite sides of a square opening 4014a are disposed along the horizontal direction. For example, when the second display board 4012 is made of an acrylic resin, an inclination angle θ between each of four surfaces 4014b of each concave surface portion 4014, which correspond to four side surfaces of the shape of the square pyramid, and the rear surface 4012a is set to about 45°. This can be understood when light reaching substantially parallel to the rear surface 4012a is supposed as shown in FIG. 16 as visible light reaching from a lower edge portion 4012b (see FIG. 13) of the second display board 4012 as described below. That is, when the inclination angle θ (see FIG. 15) of, particularly, the lowermost surface 4014bl among the four surfaces 4014b is close to a critical angle (about 42°) where light reaching from the lower edge portion 4012b is fully reflected by an acrylic resin, the reflectance of the light, which is reflected forward by each concave surface portion 4014, is increased.

Moreover, since the concave surface portions 4014 forming the numerals 18a are arranged so as to be separated from each other in the horizontal direction and the vertical direction as shown in FIG. 15, the rear surface 4012a of the second display board 4012 remains between the concave surface portions 4014. When the rear surface 4012a remains as described above, an arrangement pitch P of the concave surface portions 4014, which are formed so as to have a width W of about 0.1 mm in each of the horizontal direction and the vertical direction, is set to about 0.2 mm. In addition, the depth D of each of the concave surface portions 4014 forming the numerals 18a is set to, for example, about 0.05 mm.

As shown in FIGS. 13 and 14, the device 1 of the fourth embodiment includes an index light source 4030 that includes plural light emitting elements 4031 such as light emitting diodes (LEDs) and is provided below the second display board 4012. The respective light emitting elements 4031 are disposed on a predetermined portion, which faces the lower edge portion 4012b of the second display board 4012, of a facing part disposed so as to surround the peripheries of the display boards 4010 and 4012, and are arranged at intervals in the horizontal direction. Each light emitting element 4031 allows white visible light, which has a wavelength in the range of, for example, 450 to 660 nm, to be incident on the lower edge portion 4012b. Since visible light, which is incident on the lower edge portion 4012b from the each light emitting element 4031 in this way, is transmitted through the second display board 4012 and illuminates the index display portion 17, the visible light is reflected forward by each concave surface portion 4014 of the index row 18 as shown in FIG. 16. Since the numerals 18a, the scales 18b, and the guides 18c, which are indicated by the rotary pointer 50, as the index row 18 receive visible light reaching from any light emitting element 4031 as described above, all of the numerals 18a, the scales 18b, and the guides 18c are irradiated.

Figure 17:
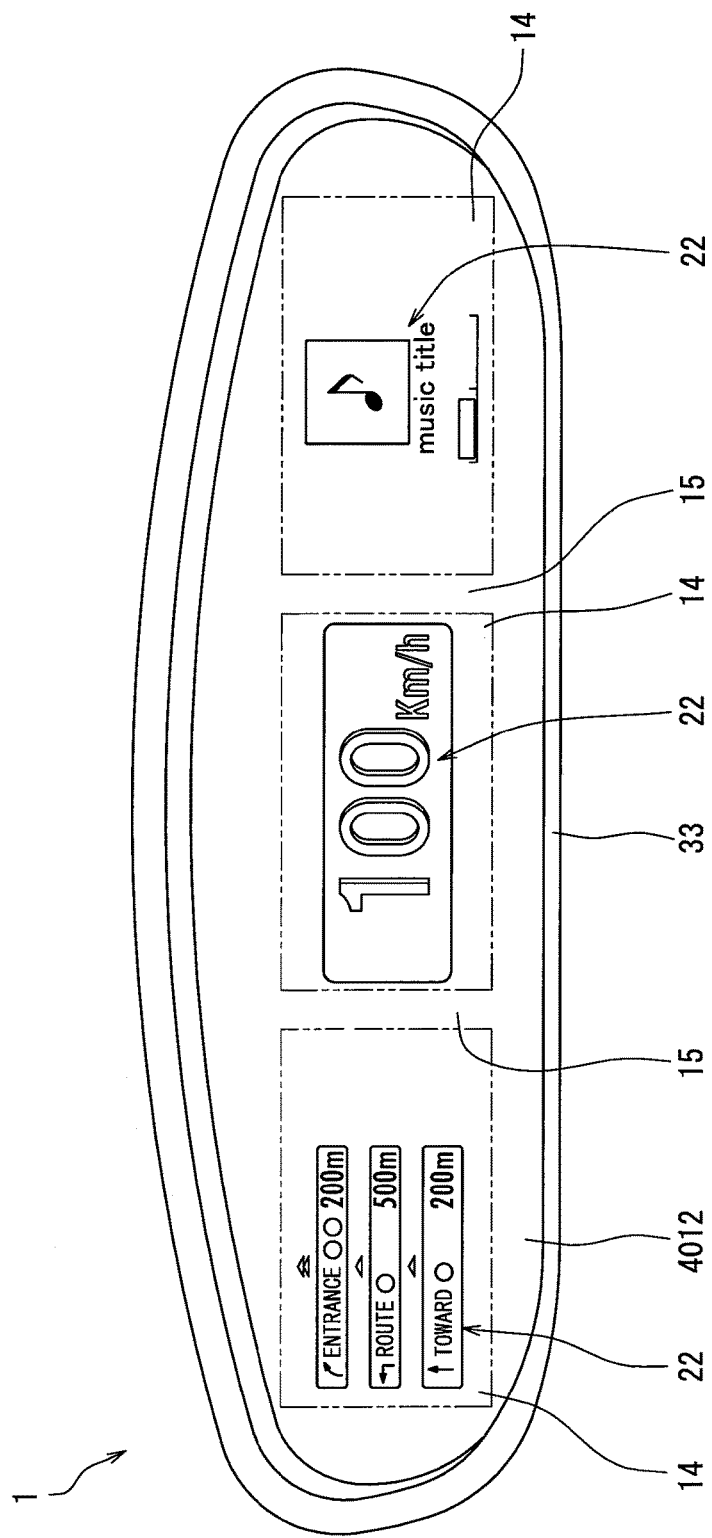
FIG. 17 is a front view showing the display state of the vehicular display device according to the fourth embodiment.

In the fourth embodiment, an index row non-display state shown in FIG. 17 can be realized in addition to the initial display state (see FIG. 5), the normal display state (see FIG. 1), and the communication display state (see FIGS. 6 and 7) of the first embodiment by the control circuit 80. Specifically, the index row non-display state is realized when a command for switching a state from the normal display state is input to the vehicle by the occupant in a period in which the engine switch continues to be turned on. In the index row non-display state, navigation information and audio information are displayed by the left and right side transmission display portions 14 and the second display board 4012 as the same vehicle information 22 as the information in the immediately preceding normal display state. In addition, in the index row non-display state, speed information, which informs the occupant of the traveling speed of the vehicle, is displayed by the middle transmission display portion 14 and the second display board 4012 as the vehicle information 22 that is different from the information in the immediately preceding normal display state. Moreover, in the index row non-display state, the index row 18 is switched to a non-display state since the flow of current is stopped by the control circuit 80 so that all of the light emitting elements 4031 are turned off, and the rotary pointer 50 is rotated to a position where the rotary pointer 50 is concealed by the hood part 33. Meanwhile, when a command for switching a state to the normal display state from the index row non-display state is input to the vehicle by the occupant, the flow of current is allowed by the control circuit 80 so that all of the light emitting elements 4031 are turned on. Accordingly, the index row 18 is switched to a display state.

According to the fourth embodiment described here, in the initial display state, the normal display state, and the communication display state, the index row 18 is irradiated according to the turn-on of the index light source 4030. Specifically, the index row 18 formed on the second display board 4012 by the index display portion 17 is irradiated in front of the respective transmission display portions 14 that individually transmit and display the screens 21 of the plural monitors 20 from the rear side and that are arranged side by side when receiving the visible light emitted from the index light source 4030. Here, each of the numerals 18*a*, the scales 18*b*, and the guides 18*c*, which form the index row 18, is formed of the plural concave surface portions 4014 that are recessed forward from the rear surface 4012*a* of the second display board 4012 in the shape of a pyramid and that reflect visible light forward. Accordingly, each of the numerals 18*a*, the scales 18*b*, and the guides 18*c* is illuminated. According to this structure, in comparison with the index row 18 that is illuminated, the occupant is less likely to pay attention to the boundary portions 15 between the respective transmission display portions 14 that perform transmission display in the rear of the index row 18 illuminated. As a result, since a sense of incongruity, which is caused when the boundary portions 15, i.e., discontinuous portions of the display of the vehicle information 22, between the respective transmission display portions 14 are viewed by the occupant, can be reduced as much as possible, the appearance of display performed by the device 1 can be improved.

Further, since the concave surface portions 4014 forming each of the numerals 18*a*, the scales 18*b*, and the guides 18*c* are arranged to be separated from each other, the rear surface 4012*a* of the second display board 4012 can be provided between the concave surface portions 4014. Accordingly, the display light of the vehicle information 22, which is transmitted through the respective transmission display portions 14, can be reliably transmitted forward from portions of the rear surface 4012*a*, which are present between the respective concave surface portions 4014, of the second display board 4012 that is positioned in front of these transmission display portions 14. Therefore, when the index row non-display state is realized, in other words, when the index row 18 is in a non-display state according to the turn-off of the index light source 4030, the vehicle information 22 can also be clearly viewed by the occupant through the second display board 4012 on which the plural concave surface portions 4014 are arranged. Consequently, this structure can contribute to the improvement of the appearance of the display performed by the device 1.

Furthermore, since the plural monitors 20 arranged side by side in the horizontal direction are disposed along the first display board 4010 even though the first display board 4010 is curved to have a curvature common to the second display board 4012, a wide display range for the vehicle information 22 displayed by the respective transmission display portions 14 can be ensured. According to this structure, when plural general-purpose monitors 20 having flat screens 21 are used even though a monitor having a screen curved along the display boards 4010 and 4012 is not used, occupant's attention to the boundary portions 15 can be suppressed while the display of the vehicle information 22 over a wide range is realized. Accordingly, the appearance of the display performed by the device 1, which is suitable for mass production, can be improved. It should be understood that effects other than the above-mentioned effects are the same as the effects of the first embodiment.

Fifth Embodiment

Figure 18:
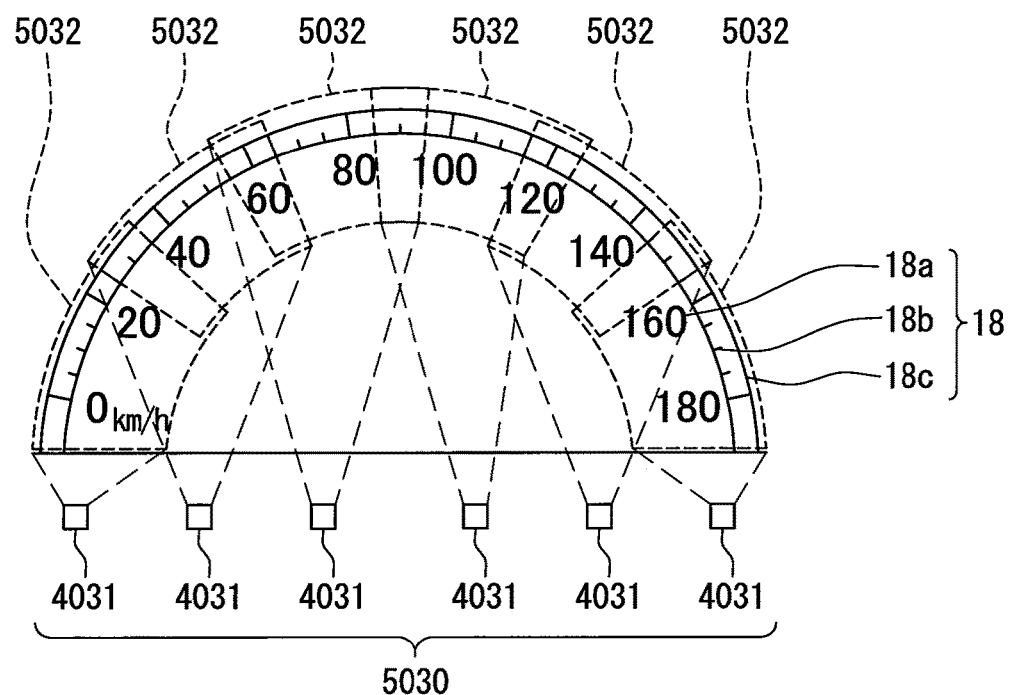
FIG. 18 is a schematic view showing the operation of a fifth embodiment.

As shown in FIG. 18, a fifth embodiment of this disclosure is a modification of the fourth embodiment. A range in which respective light emitting elements 4031 of an index light source 5030 of the fifth embodiment are disposed in the horizontal direction (that is, a range between the leftmost light emitting element 4031 and the rightmost light emitting element 4031) is set according to a range in which the index display portion 17 is formed (that is, a range in which the index row 18 extends). Due to this setting, in the index row 18, irradiation target areas 5032, which are irradiated with visible light by the respective light emitting elements 4031 turned on, are offset from each other in an arc direction of the index row 18. However, the irradiation target areas 5032, which are adjacent to each other in the arc direction of the index row 18, are offset from each other so that end portions of both the irradiation target areas overlap each other.

In an initial display state of the fifth embodiment, each of the light emitting elements 4031 of the index light source 5030 is turned on by current flow control from the control circuit 80 when the rotary pointer 50 indicates the corresponding irradiation target area 5032. In other words, each of the light emitting elements 4031 of the index light source 5030 is turned off when a destination of the rotary pointer 50 deviates from the corresponding irradiation target area 5032.

According to the fifth embodiment described here, the plural light emitting elements 4031, which apply visible light to the irradiation target areas 5032 offset from each other, are turned on when these irradiation target areas 5032 are indicated by the rotary pointer 50. Accordingly, the light emitting elements 4031 illuminate the area 5032 corresponding to the destination. According to this structure, since the light-emitting display of only the area 5032, which corresponds to the destination of the rotary pointer 50, of the index row 18 is realized, the occupant is likely to pay attention to the destination. Therefore, since an effect of suppressing the occupant's attention to the boundary portions 15 between the respective transmission display portions 14 and a presentation effect caused by the change of the destination of attention can be obtained, the appearance of the display performed by the device 1 can be improved. Meanwhile, effects other than the above-mentioned effects are the same as the effects of the fourth embodiment.

Other Embodiments

The plural embodiments of this disclosure have been described above, but the interpretation of this disclosure is not limited to these embodiments and the disclosure can be applied to various embodiments and the combination thereof without departing from the gist of this disclosure.

Specifically, in a first modification relevant to the first to fifth embodiments, the index row 18 may be formed over the front side of two or four or more transmission display portions 14. Further, in a second modification relevant to the first to fifth embodiments, the respective monitors 20 may be disposed along the display boards 10 and 4010 that linearly extend in the horizontal direction. Furthermore, in a third modification relevant to the first to fifth embodiments, communication information, which is the vehicle information 22, may not be displayed as an animation when a state is switched to the second communication display state from the first communication display state.

In a fourth modification relevant to the first embodiment and the third to fifth embodiments, the rotary pointer 50, which is provided with the fluorescent layer 2051 in the second embodiment, may be irradiated with ultraviolet light emitted from the pointer light source 70 so that the fluorescent layer 2051 is irradiated. Further, in a fifth modification relevant to the second embodiment, the light emitting elements 31 may be turned on as the rotary pointer 2050 indicates the irradiation target areas 32 of the respective light emitting elements 31 in the third embodiment.

In a sixth modification relevant to the first to fifth embodiments, the smoke layers 13 may not be provided. Further, in a seventh modification relevant to the first to fifth embodiments, the cover 40 may not have a function to limit the transmittance of ultraviolet light to visible light.

When all of the light emitting elements 31 are turned off in the first to third embodiments, the colorless and transparent index row 18, which does not emit light, can transmit the display light from the respective monitors 20 passing through the respective transmission display portions 14 that are provided in the rear of the index row 18. Accordingly, in an eighth modification of the first to third embodiments, a display state in which the flow of current is stopped by the control circuit 80 according to a command or the like from, for example, an occupant to turn off all of the light emitting elements 31 and only the transmission display of the screen 21 of each monitor 20 through each transmission display portion 14 and the index row 18 is performed is also added to the fourth embodiment.

In a ninth modification relevant to the fourth and fifth embodiments, the index row non-display state may not be realized in the first embodiment. Further, in a tenth modification relevant to the fourth and fifth embodiments, a conical concave surface portion 4014 of which the opening 4014a has a circular shape may be employed.

Figure 19:
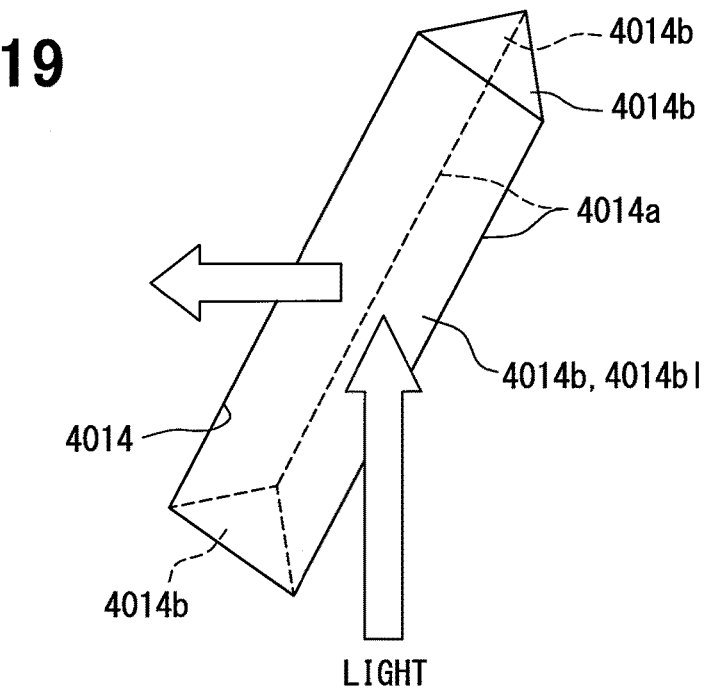
FIG. 19 is a view showing a modification of the fourth embodiment and is a perspective view corresponding to FIG. 16.
Figure 20:
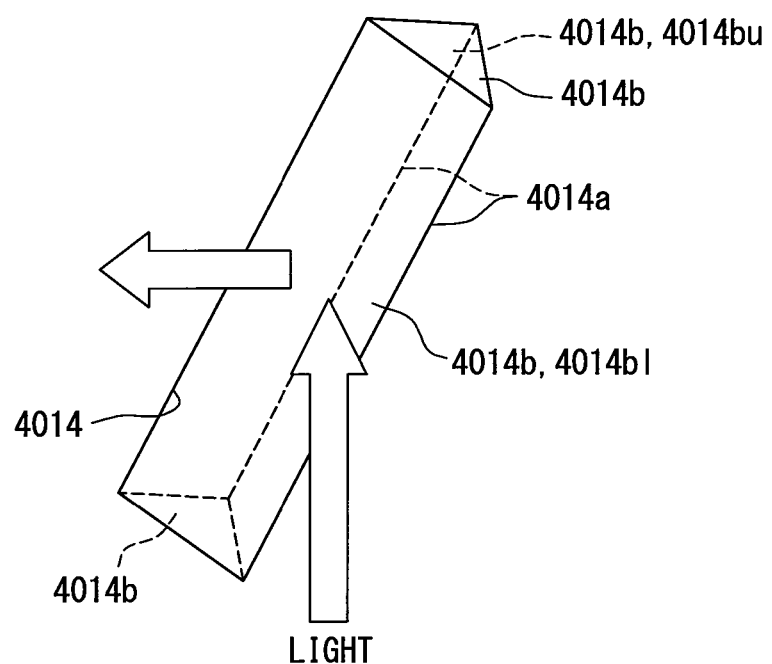
FIG. 20 is a view showing the modification of the fourth embodiment and is a perspective view corresponding to FIG. 16.

In an eleventh modification relevant to the fourth and fifth embodiments, a V-shape grooved concave surface portion 4014 of which two opposite sides of a rectangular (including square) opening 4014a are disposed along the horizontal direction and both left and right side surfaces 4014b are parallel to the vertical direction may be employed as shown in FIGS. 19 and 20. Here, particularly, in the eleventh modification of FIG. 20, the uppermost surface 4014b among four surfaces 4014b is disposed so as to be substantially perpendicular to the vertical direction.

Figure 21:
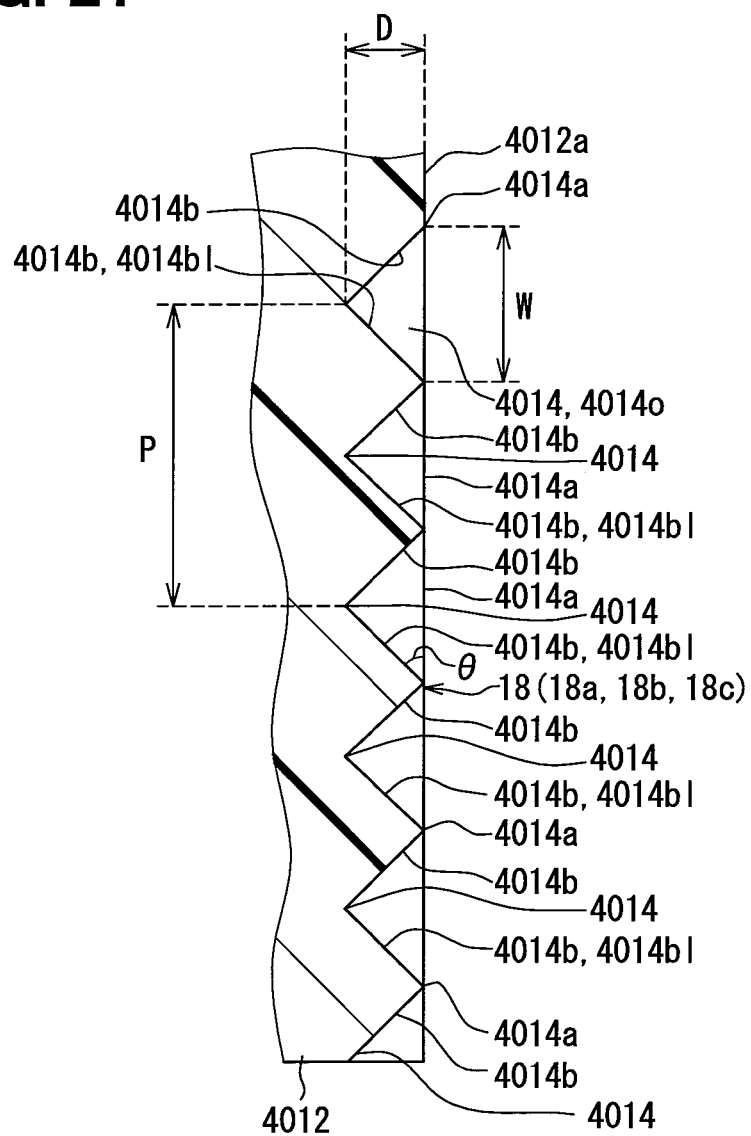
FIG. 21 is a view showing the modification of the fourth embodiment and is a cross-sectional view corresponding to FIG. 15.

In a twelfth modification relevant to the fourth and fifth embodiments, as shown in FIG. 21, concave surface portions 4014 may be continuously arranged without being substantially separated from each other. Further, in a thirteenth modification relevant to the fourth and fifth embodiments, visible light may be applied to the index row 18 from edge portions of the second display board 4012 other than a lower edge portion 4012b.

The invention claimed is:

1. A vehicular display device comprising:
   a plurality of monitors, each of the plurality of monitors including a screen displaying vehicle information;
   a display board including a plurality of transmission display portions arranged side by side, a boundary portion positioned between the plurality of transmission display portions, and an index display portion forming an index row to display a vehicle state value, each of the plurality of transmission display portions transmitting and displaying the screen of a respective one of the plurality of monitors from a rear side; and
   an index light source that illuminates the index display portion, wherein
   the index light source applies ultraviolet light for irradiating the index display portion to the index row from a front side of the display board,
   the index row is formed continuously in front of and over each of the plurality of transmission display portions and crosses over the boundary portion positioned between the plurality of transmission display portions, and
   the index row is irradiated when receiving the ultraviolet light.

2. The vehicular display device according to claim 1, wherein
   the display board is curved to have a curvature in a horizontal direction, and
   the plurality of monitors are arranged side by side in the horizontal direction along the display board.

3. The vehicular display device according to claim 1, further comprising:
   a rotary pointer that indicates the index row by rotating in front of the index display portion.

4. The vehicular display device according to claim 1, wherein
   the vehicle information is displayed as an animation to move between the plurality of transmission display portions that are adjacent to each other, and
   the index row is formed over the plurality of transmission display portions.

5. The vehicular display device according to claim 1, wherein
   the index row is formed in front of and over each of the plurality of transmission display portions and the boundary portion, interposed therebetween.

6. The vehicular display device according to claim 3, wherein
   the index light source includes a plurality of light emitting elements, each of the plurality of light emitting elements emitting the ultraviolet light on a respective irradiation target area of the index row, the irradiation target area of one of the plurality of light emitting elements being offset from the irradiation target area of an other of the plurality of light emitting elements, and
   each of the plurality of light emitting elements is turned on when the corresponding irradiation target area is indicated by the rotary pointer.

7. The vehicular display device according to claim 3, wherein
   the rotary pointer is irradiated in front of the index display portion by receiving the ultraviolet light from the index light source.

8. A vehicular display device comprising:
   a plurality of monitors, each of the plurality of monitors including a screen displaying vehicle information;
   a first display board including a plurality of transmission display portions arranged side by side and a boundary portion positioned between the plurality of transmission display portions, each of the plurality of transmission display portions transmitting and displaying the screen of a respective one of the plurality of monitors from a rear side;

a second display board that includes an index display portion forming an index row in front of the first display board to display a vehicle state value; and an index light source that illuminates the index display portion, wherein the index light source applies visible light for illuminating the index display portion to the index row from an edge portion of the second display board, the second display board includes a plurality of concave surface portions that are recessed forward from a rear surface of the second display board to reflect forward the visible light emitted from the index light source, the index row is formed continuously in front of and over each of the plurality of transmission display portions and crosses over the boundary portion positioned between the plurality of transmission display portions, and the plurality of concave surface portions are arranged to form a respective one of a plurality of indexes, which form the index row, so that the plurality of indexes are illuminated by receiving the visible light emitted from the index light source.

9. The vehicular display device according to claim 8, wherein the plurality of concave surface portions are arranged to be separated from each other, and the index row is switched between a display state and a non-display state according to an on/off state of the index light source.

10. The vehicular display device according to claim 8, wherein the first and second display boards are curved to have a common curvature in a horizontal direction, and the plurality of monitors are arranged side by side in the horizontal direction along the first display board.

11. The vehicular display device according to claim 8, further comprising:

a rotary pointer that indicates the index row by rotating in front of the index display portion.

12. The vehicular display device according to claim 8, wherein the index row is formed in front of and over each of the plurality of transmission display portions and the boundary portion, interposed therebetween.

13. The vehicular display device according to claim 11, wherein the index light source includes a plurality of light emitting elements, each of the plurality of light emitting elements emitting the visible light on a respective irradiation target area of the index row, the irradiation target area of one of the plurality of light emitting elements being offset from the irradiation target area of an other of the plurality of light emitting elements, and each of the plurality of light emitting elements is turned on when the corresponding irradiation target area is indicated by the rotary pointer.

* * * * *